US 8,395,681 B2

(12) United States Patent
Sekiguchi et al.

(10) Patent No.: US 8,395,681 B2
(45) Date of Patent: Mar. 12, 2013

(54) RECORDING APPARATUS, CONTROL METHOD, AND PROGRAM

(75) Inventors: Tomohiro Sekiguchi, Kawasaki (JP); Shuichiro Matsushima, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 566 days.

(21) Appl. No.: 12/537,089

(22) Filed: Aug. 6, 2009

(65) Prior Publication Data

US 2010/0045823 A1   Feb. 25, 2010

(30) Foreign Application Priority Data

Aug. 22, 2008   (JP) ................................ 2008-214680

(51) Int. Cl.
*H04N 5/76* (2006.01)
(52) U.S. Cl. ................ 348/231.99; 348/231.2
(58) Field of Classification Search ............... 348/231.1, 348/231.4, 231.7, 231.8, 231.9, 231.15, 231.3
See application file for complete search history.

(56) References Cited

U.S. PATENT DOCUMENTS

| | | | | |
|---|---|---|---|---|
| 6,912,002 | B1* | 6/2005 | Soga | 348/231.2 |
| 7,612,806 | B2* | 11/2009 | Kazami et al. | 348/231.1 |
| 2002/0112112 | A1* | 8/2002 | Yoshida | 711/1 |
| 2003/0088557 | A1* | 5/2003 | Morino | 707/3 |
| 2003/0095195 | A1 | 5/2003 | Iwauchi | |
| 2004/0003191 | A1* | 1/2004 | Minne | 711/163 |
| 2008/0107406 | A1* | 5/2008 | Sekiguchi | 386/124 |
| 2008/0151059 | A1* | 6/2008 | Mizuno | 348/207.1 |
| 2008/0313216 | A1* | 12/2008 | Kobayashi | 707/102 |

FOREIGN PATENT DOCUMENTS

| | | |
|---|---|---|
| JP | 2003-150929 A | 5/2003 |
| JP | 2003-158645 A | 5/2003 |
| JP | 2003-244619 A | 8/2003 |

OTHER PUBLICATIONS

Nikon"D3100" Refernce Manual, attached a pdf file of p. 145.*
Nikon "D3100" Reference Manual, attached a pdf file of p. 145.*

* cited by examiner

*Primary Examiner* — Roberto Velez
*Assistant Examiner* — Abdelaaziz Tissire
(74) *Attorney, Agent, or Firm* — Canon USA Inc. IP Division

(57) ABSTRACT

A recording apparatus including a mounting portion configured to allow a rewritable recording medium and an unrewritable recording medium to be mounted thereon includes a determination unit configured to determine a file name with a number for recording a file on a recording medium mounted on the mounting portion, and a recording control unit configured to record, on the recording medium mounted on the mounting portion, the file using the file name determined by the determination unit, wherein the determination unit changes a file name determination method when the recording medium mounted on the mounting portion is replaced such that the rewritable recording medium and the unrewritable recording medium are replaced with each other.

10 Claims, 20 Drawing Sheets

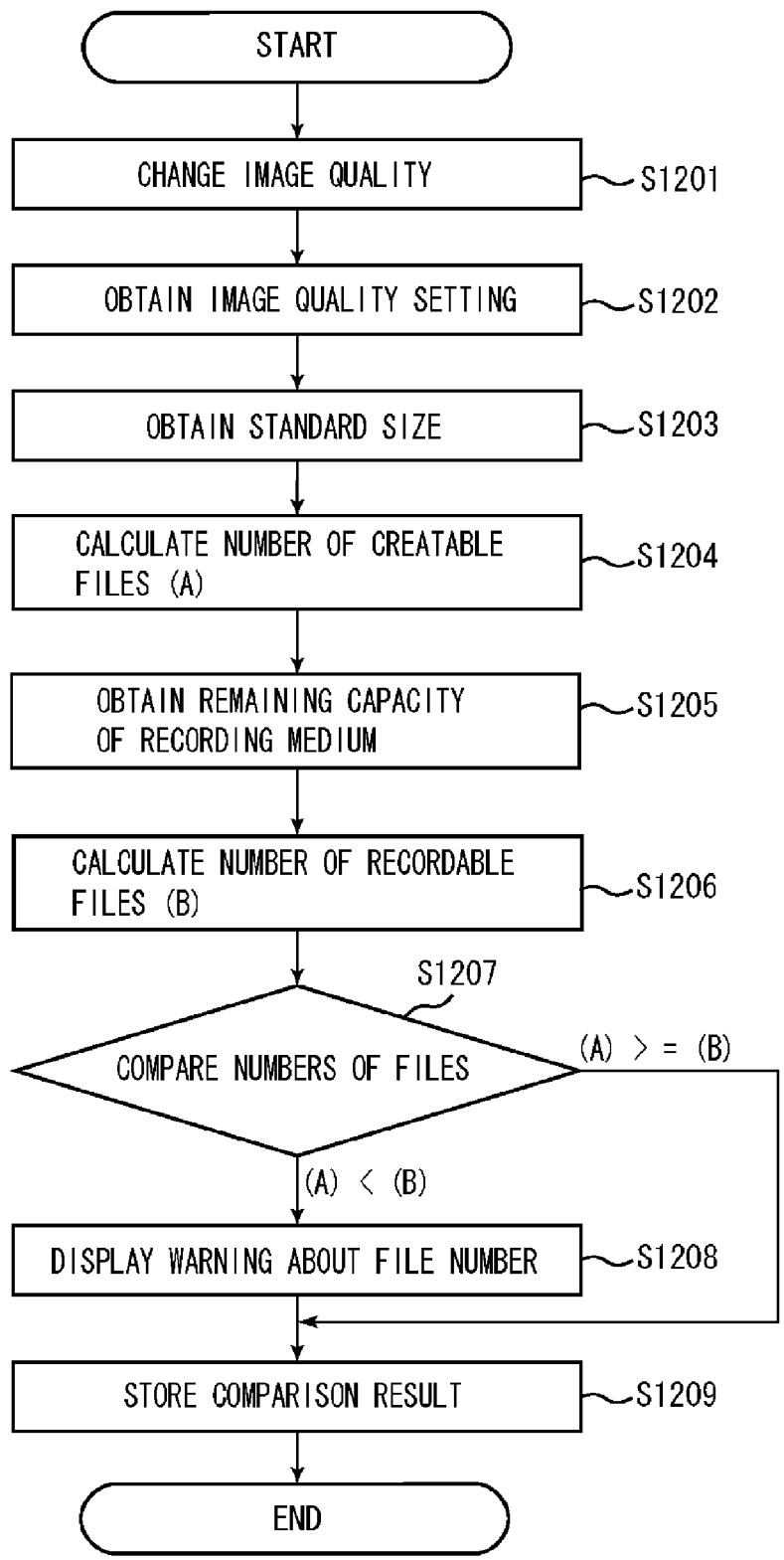

SHOOTING MODE PREVIEW SCREEN

IMAGE SIZE SETTING SCREEN

IMAGE QUALITY SETTING SCREEN

SHOOTING MODE FILE NUMBER WARNING SCREEN

SHOOTING MODE PREVIEW SCREEN (WITH WARNING ICON)

PLAYBACK MODE PREVIEW SCREEN

PLAYBACK MODE PREVIEW SCREEN (WITH WARNING ICON)

WARNING SCREEN DURING EXTERNAL DEVICE CONNECTION PROCESSING

EXTERNAL DEVICE CONNECTION SCREEN

WARNING SCREEN DURING EXTERNAL DEVICE CONNECTION

EXTERNAL DEVICE CONNECTION SCREEN (WITH WARNING ICON)

RECORDING APPARATUS, CONTROL METHOD, AND PROGRAM

BACKGROUND OF THE INVENTION

1. Field of the Invention

The present invention relates to a recording apparatus for storing on a recording medium a data file of image data according to a predetermined file name naming rule in a digital camera or an audio recording apparatus, and a control method and program for such a recording apparatus.

2. Description of the Related Art

In recent years, due to developments of digital technology, a digital camera capable of electronically processing captured image information and video information has been in widespread use. In such a digital camera, an object image formed when an object light flux having passed through a shooting lens and reached a solid-state image sensor, such as a charge coupled device (CCD), is converted into electronic signals to be output as image signals. Various conversion processing operations are performed on the image signals output from the solid-state image sensor in an image processing circuit to ultimately store the image signals as an image file on a recording medium, such as a memory card.

As a standard for managing image files on a recording medium of a digital camera, Design rule for Camera File system (DCF) (Japanese Electronic Industry Development Association (JEIDA) standard:), which is a camera file system standard, is currently predominant. As a standard for managing video files on a recording medium, standards such as SD-Video and Advanced Video Codec High Definition (AVCHD) have widely been known.

In a digital camera, a file is generally managed using a file name with a number according to DCF standard. Specifically, directory names and file names in a recording medium are managed using numbers that do not overlap with one another, and the file names are generated by increasing the file number by one in the order of recording. In the DCF standard, the directory name includes xxxyyyyy (xxx: value from 100 to 999, y: arbitrary character), and the file name includes YYYYXXXX (XXXX: value form 0001 to 9999, Y: arbitrary character) Depending on a camera, there is a function that prevents the numbers from being overlapped irrespective of the recording medium in such a manner that previously recorded directory numbers and file numbers are stored in a built-in memory so that the directory numbers and file numbers are carried over even when the recording medium is replaced. When a switching function for disabling such function is simultaneously provided, it is also possible to record image data on a new recording medium by assigning an initial directory number and an initial file number (e.g., 100yyyyy directory, YYYY0001.JPG file).

However, in the above-mentioned file system standard, since there is a limitation in the naming rule for files and directories, a phenomenon of being prevented from generating a new file or a new directory occurs even though the actual recording memory is not full. Some digital cameras inhibit further recording when recording of a directory name "999yyyyy" and a file name "YYYY9999" has been performed. Therefore, when the directory number and the file number reach upper limits during image shooting, it is necessary to reset the numbers by initializing the recording medium once to continue the image shooting.

The image data is generally recorded on a recording medium which can be rewritten many times, such as a card type semiconductor memory and a digital versatile disc (DVD)-RW. On the other hand, it is expected that there will be more and more opportunities for recording image data on a DVD-R and recording mediums which allow data recording only for once will be increased.

In the case of recording a file on such a write-once recording medium, when the directory number and the file number reach the upper limits, it is no longer possible to perform image shooting by the digital camera that inhibits further recording as mentioned above. Furthermore, since the write-once recording medium cannot be reset by initialization, there is a possibility that it is impossible to shoot a new image by using the recording medium even though there is a free space.

There has been known a method wherein a recorded file structure is analyzed to detect an unused directory number and an unused file number, and recording is performed using the unused directory number and the unused file number. However, since images are reproduced in an ascending order of the directory number and the file number in the case of reproducing recorded images, there is a problem that the order of the images to be reproduced and the order of shooting are inconsistent, e.g., the temporal sequence is lost.

Japanese Patent Application Laid-Open No. 2003-150929 discusses a method of continuing recording on an unused directory or a newly generated directory when a file number reaches an upper limit. However, though the method discussed in Japanese Patent Application Laid-Open No. 2003-150929 has the advantage of being capable of continuing recording even when the file number reaches the upper limit, a temporal sequence of the file numbers and order of recording are lost. Since recording is performed with a folder and a file name having character strings that are different from those of the previously recorded folders and file names, file organization can be complicated after such recording.

In Japanese Patent Application Laid-Open No. 2003-158645, the number of files that can be generated on a recording medium is calculated based on a storage standard of a file, and the number of files that can be recorded on the recording medium is calculated based on a remaining capacity of the recording medium. After that, the file numbers are compared to each other to display the smaller value as the number of files that can be shot as well as to display a warning therefor together with a dealing method. Here, the dealing method is a method of renumbering directories in an ascending order from the initial value or a method of changing a directory name.

SUMMARY OF THE INVENTION

According to an aspect of the present invention, a recording apparatus including a mounting portion configured to allow a rewritable recording medium and an unrewritable recording medium to be mounted thereon includes a determination unit configured to determine a file name with a number for recording a file on a recording medium mounted on the mounting portion, and a recording control unit configured to record, on the recording medium mounted on the mounting portion, the file using the file name determined by the determination unit, wherein the determination unit changes a file name determination method when the recording medium mounted on the mounting portion is replaced such that the rewritable recording medium and the unrewritable recording medium are replaced with each other.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 19 is a flowchart illustrating an operation of the digital camera according to the third exemplary embodiment of the invention.

DETAILED DESCRIPTION OF THE EMBODIMENTS

Various exemplary embodiments, features, and aspects of the invention will be described in detail below with reference to the drawings.

Figure 1:
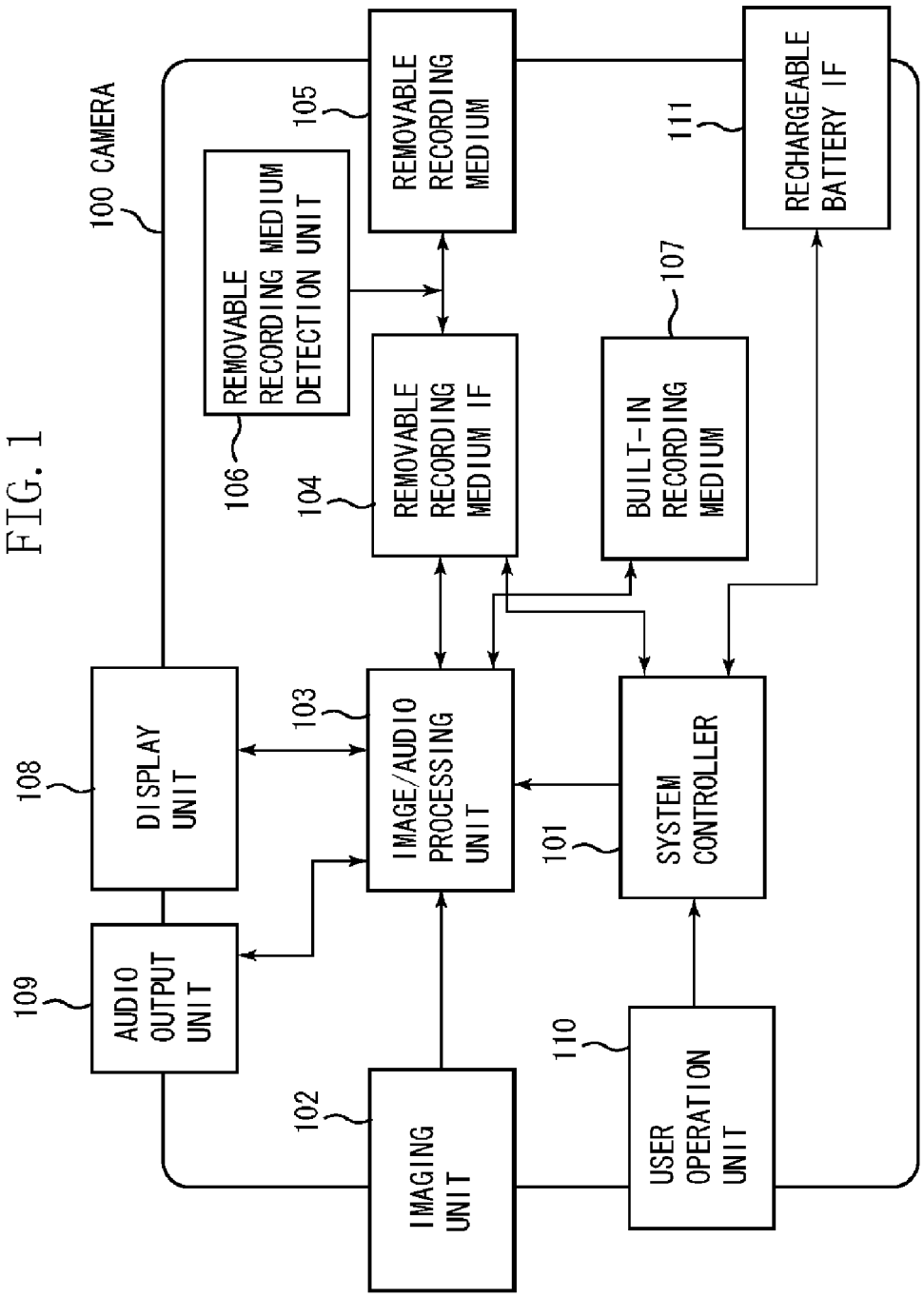
FIG. 1 is a block diagram illustrating a configuration of a digital camera according to a first exemplary embodiment of the invention.

FIG. 1 is a block diagram illustrating a configuration of a digital camera according to a first exemplary embodiment of the invention. A digital camera 100 includes a system controller 101 for controlling a system and blocks for processing functions.

An imaging unit 102 includes an optical system, a motor for controlling the optical system, and an image sensor. In the case of recording a video by using the camera 100, external light passing through the imaging unit 102 forms an optical image on a plane of the image sensor, and the optical image is converted into electric signals by the image sensor. An image/audio processing unit 103 converts the electric signals obtained by the conversion by the image sensor into digital data.

A recording medium (recording media) 105 is removably inserted into or mounted on a mounting portion of the main body of the digital camera 100. It is possible to insert as the recording medium 105 either a rewritable recording medium or an unrewritable recording medium (write-once recording medium) The digital data obtained by the conversion by the image/audio processing unit 103 is recorded on the recording medium 105 via a recording medium interface 104. A recording medium detection unit 106 detects a state of insertion of the recording medium 105. A recording medium 107 is a built-in recording medium in the camera main body, and the digital data obtained by the conversion by the image/audio processing unit 103 can be recorded on the recording medium 107.

In the case of reproducing data recorded on the recording medium 105 (or 107), the data is read out from the recording medium 105 (or 107) and converted into data that is optimum for display by the image/audio processing unit 103 to be displayed on a display unit 108.

An audio output unit 109 outputs a warning sound for informing a user of an internal state of the camera or sounds during video reproduction. The warning and the camera operation state are simultaneously displayed on the display unit 108.

The user can operate the camera 100 via a user operation unit 110. A rechargeable battery interface (IF) 111 is used for performing control for recharging a battery.

Figure 2:
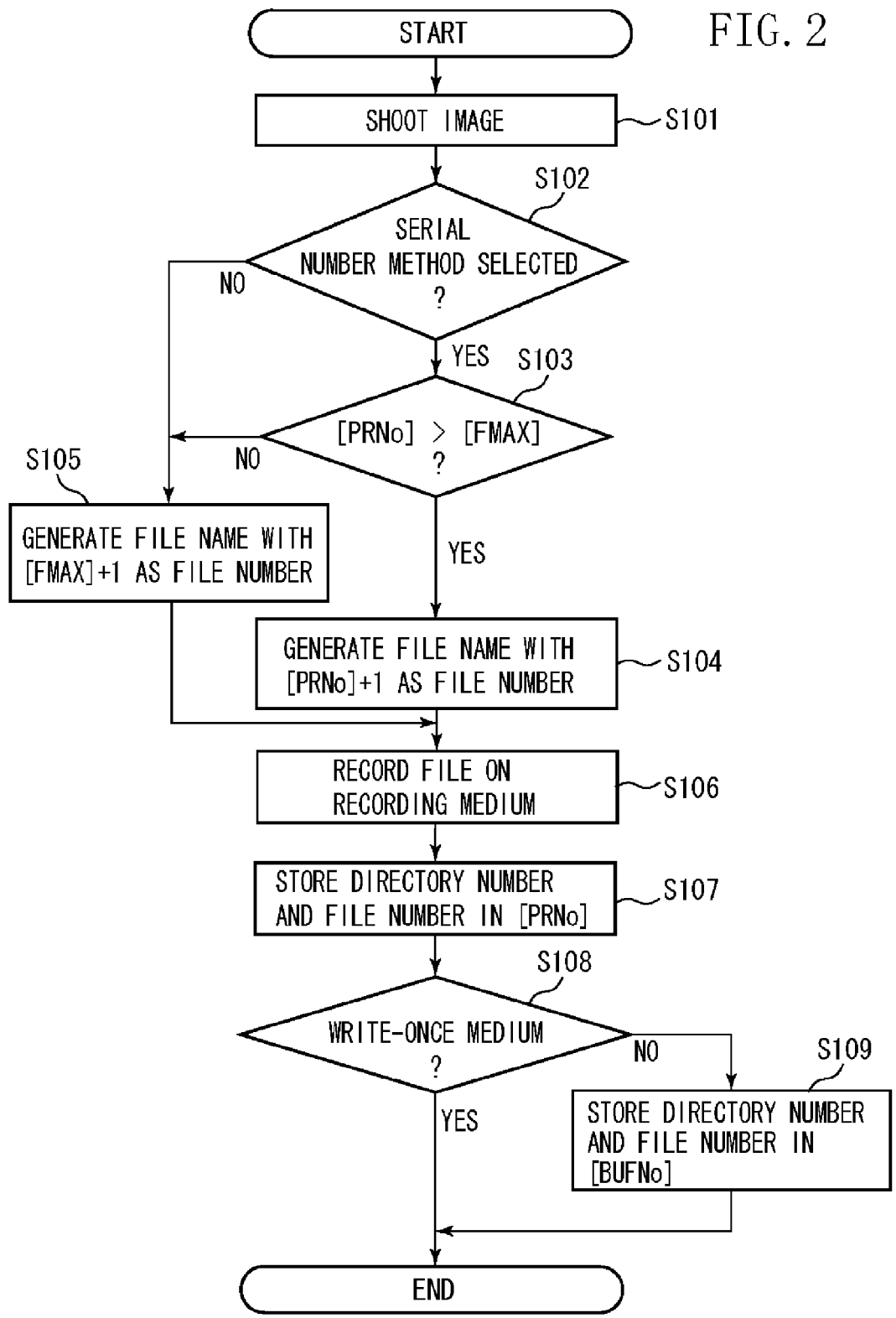
FIG. 2 is a flowchart illustrating an operation of the digital camera according to the first exemplary embodiment.
Figure 3:
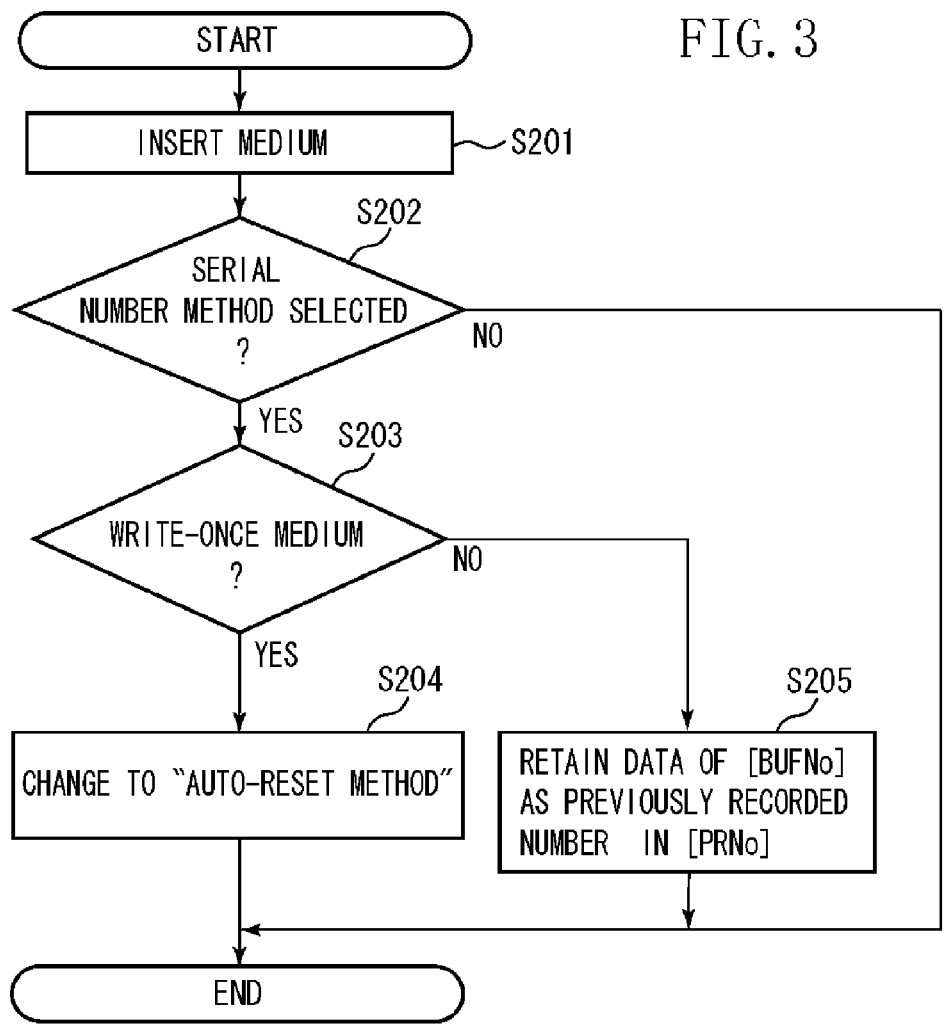
FIG. 3 is a flowchart illustrating an operation of the digital camera according to the first exemplary embodiment.

Each of FIGS. 2 and 3 is a flowchart illustrating an operation of the digital camera according to the first exemplary embodiment. Steps described below are realized when the system controller 101 operates according to a program.

FIG. 2 is the flowchart illustrating a basic operation for image shooting. In step S101, when the digital camera 100 shoots a still image in a state where a recording medium (1) is inserted into the mounting portion, the system controller 101 performs processing for recording a file of image data on the recording medium (1).

When recording the file, it is necessary to determine a directory name and a file name for recording. The method for determining a file name includes two types of methods: "serial number method" and "auto-reset method" in a broad sense.

In the serial number method, the names of the files shot by one camera are prevented from being overlapped irrespective of the recording mediums. Specifically, a built-in memory for storing number information to be used for determining a number to be assigned to a file is provided, and the number to be assigned to the file name is determined by a comparison between the number information stored in the built-on memory and numbers of files stored in the recording medium 105 inserted into the mounting portion. More specifically, the number information stored in the built-ion memory and a maximum file number stored in the recording medium 105 inserted into the mounting portion are compared, and a number obtained by adding 1 (one) to the larger number is assigned.

In the auto-reset method, a number to be assigned to a file name is determined by referring to numbers of files stored in the recording medium 105 inserted into the mounting portion without using the number information stored in the built-in memory. More specifically, a number obtained by adding 1

(one) to a maximum file number stored in the recording medium 105 inserted into the mounting portion is assigned.

Figure 4:
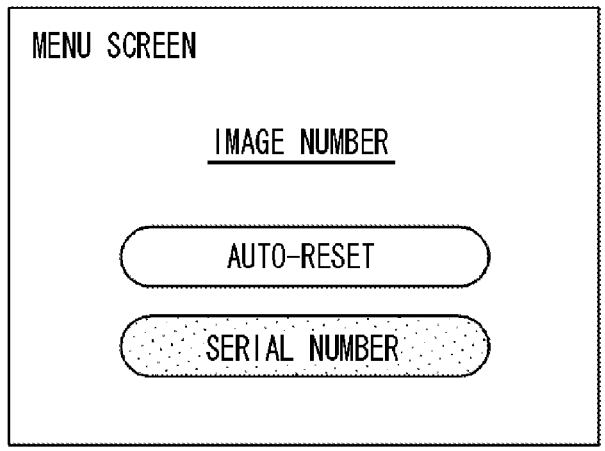
FIG. 4 illustrates an example of a menu screen for setting a file name determination method.

It is possible to perform selection between these two file name determination methods via a menu screen illustrated in FIG. 4.

Figure 5A:
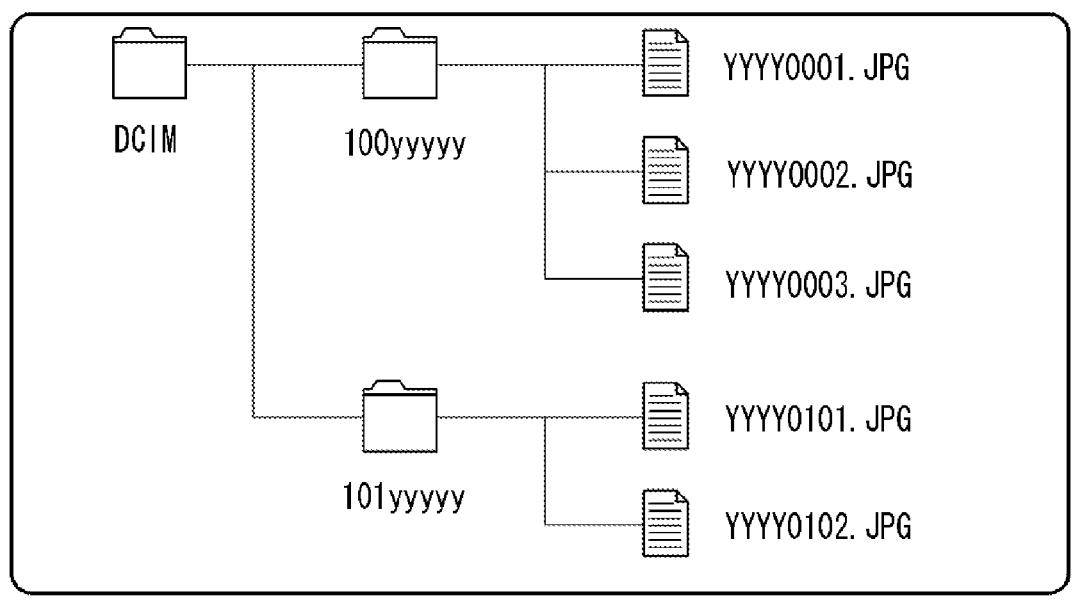
FIGS. 5A and 5B illustrate examples of file structures.
Figure 5B:
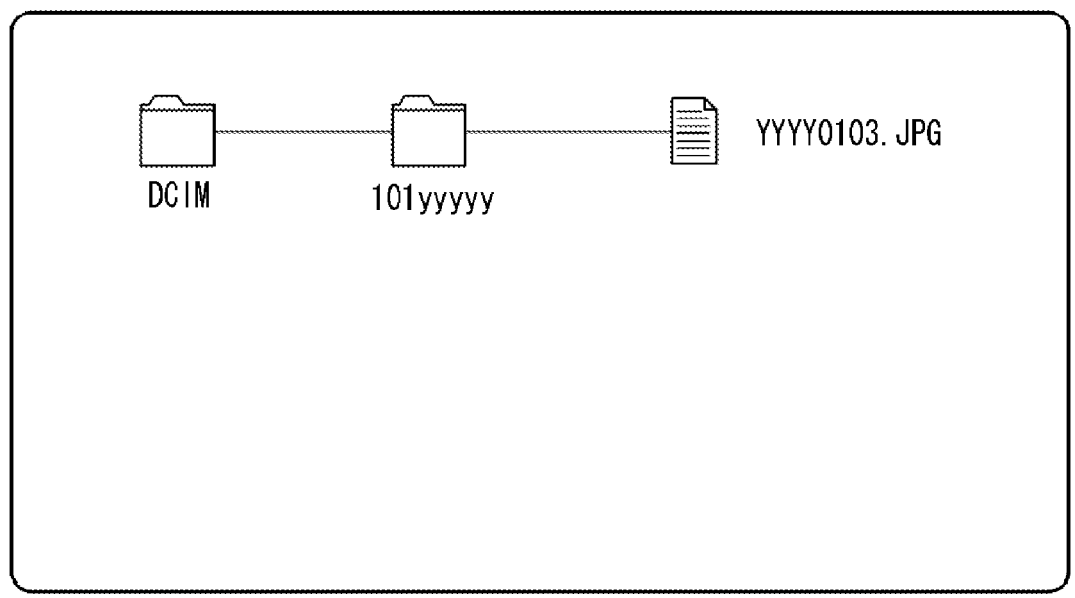
Figure 6A:
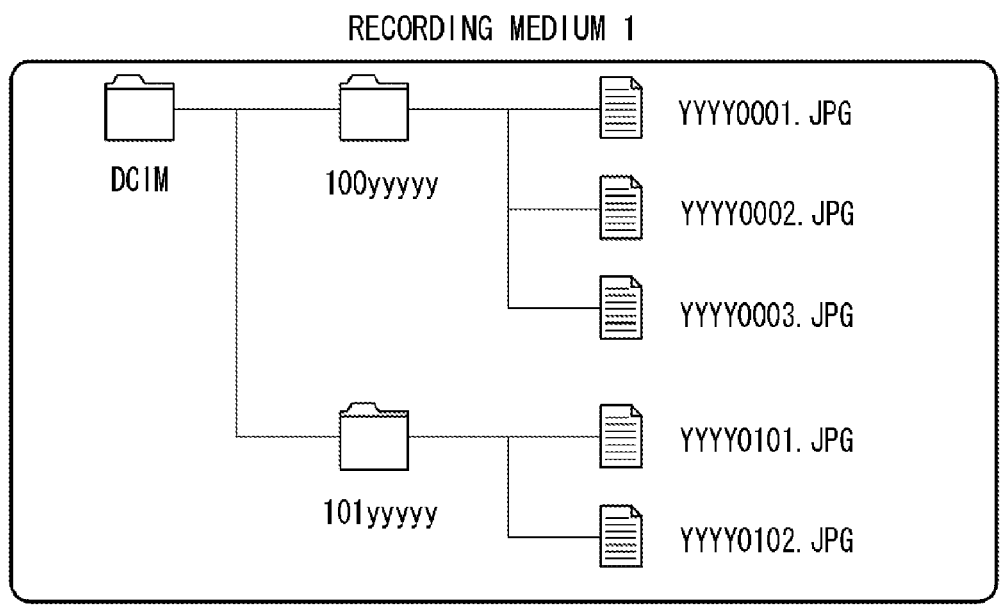
FIGS. 6A and 6B illustrate examples of file structures.
Figure 6B:
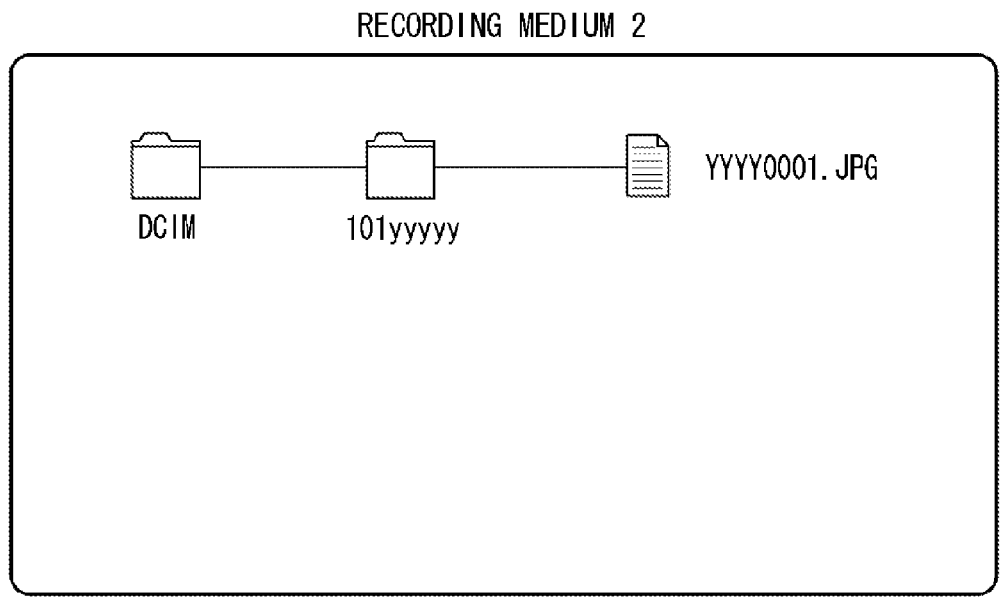

If the serial number method is selected, as illustrated in FIGS. 5A and 5B, when image shooting is repeatedly performed on a recording medium (1), a file having a file name "YYYY0102.JPG" is recorded on the recording medium (1). When image shooting is performed after replacing the recording medium (1) with a recording medium (2), a file having a file name "YYYY0103.JPG" is generated and recorded on the recording medium (2). If the auto-reset method is selected, as illustrated in FIGS. 6A and 6B, when image shooting is repeatedly performed on the recording medium (1), a file having a file name "YYYY0102.JPG" is recorded on the recording medium (1). When image shooting is performed after replacing the recording medium (1) with a recording medium (2), a file having a file name "YYYY0001.JPG" is generated and recorded on the recording medium (2).

Referring back to FIG. 2, in step S102, the system controller 101 determines whether or not the serial number method is set as the file name determination method.

When it is determined in step S102 that the serial number method is set (YES in step S102), then in step S103, the system controller 101 reads out from the built-in memory a directory number and a file number [PRNo] that are previously recorded by the camera 100 to compare them with a maximum directory number and a maximum file number [FMAX] of the recording medium (1). When [PRNo] is larger ([PRNo]>[FMAX]) (YES in step S103), the system controller 101 in step S104 generates a file name by using [PRNo]+1 as a file number, and, then in step S106, the file is recorded on the recording medium (1) by the recording control unit. When [FMAX] is larger ([PMNo]≦[FMAX]) (NO in step S103), the system controller 101 in step S105 generates a file name by using [FMAX]+1 as a file number, and, then in step S106, the file is recorded on the recording medium (1) by the recording control unit.

When it is determined in step S102 that the auto-reset method, not the serial number method, is set (NO in step S102), the system controller 101 in step S105 generates a file name by using [FMAX]+1 as a file number, and, then in step S106, the file is recorded on the recording medium (1) by the recording control unit.

After the file is recorded, the system controller 101 in step S107 stores the recorded directory number and the recorded file number in [PRNo].

In step S108, the system controller 101 determines whether or not the recording medium (1) on which the file has been recorded is a write-once recording medium. When it is determined in step S108 that the recording medium (1) is not a write-once recording medium (NO in step S108), i.e., in the case of a rewritable recording medium, the system controller 101 in step S109 stores the directory number and file number [BUFNo] that are currently recorded on the rewritable recording medium as the last recorded directly number and file number.

In the flowchart of FIG. 2, though the serial number method can be set when a write-once recording medium is used, a case described in a third exemplary embodiment can occur, where it is possible to select the serial number method when a write-once recording medium is used. It is even possible that the serial number method is selected by the user. The explanation in FIG. 2 serves as the explanation for the case of using a rewritable recording medium (determination in step S108 is always NO) when the auto-reset method is set for the use of a write-once recording medium, and the description of the flowchart of FIG. 2 is given in consideration of designing for the case where a write-once recording medium is used.

FIG. 3 is a flowchart illustrating an operation for replacing the rewritable recording medium (1) with another recording medium (2). When the recording medium (1) is replaced with the recording medium (2) in step S201, it is determined in step S202 whether or not the serial number method is selected. When it is determined that the serial number method is selected in step S202 (YES in step S202), the system controller 101 in step S203 determines whether or not the recording medium (2) is a write-once recording medium.

When it is determined in step S203 that the recording medium (2) is a write-once recording medium (YES in step S203), the system controller 101 in step S204 automatically changes the file name determination method from the serial number method to the auto-reset method. When it is determined in step S203 that the recording medium (2) is not a write-once recording medium (NO in step S203), i.e., in the case of a rewritable recording medium, the system controller 101 in step S205 retains the directory number and the file number [BUFNo] that were last recorded on the rewritable recording medium in the previously recorded directory number and the previously recorded file number [PRNo].

Here, it is assumed that both of the recording medium (1) and the recording medium (2) are also rewritable recording mediums in a state where the serial number method is set. It is assumed that files are recorded until a directory name reaches "101yyyyy" and a file name reaches "YYYY0102.JPG" as illustrated in FIG. 5A. In such case, when image shooting is performed after replacement with the recording medium (2), a file having a directory name "101yyyyy" and a file name "YYYY0103.JPG" is recorded on the recording medium (2) according to the serial number method, as illustrated in FIG. 5B.

In contrast, it is assumed that the recording medium (1) is a rewritable recording medium and the recording medium (2) is a write-once recording medium in a state where the serial number method is set. It is assumed that files are recorded until a directory name reaches "101yyyyy" and a file name reaches "YYYY0102.JPG" as illustrated in FIG. 6A. In such case, when image shooting is performed after replacement with the recording medium (2), a file having a directory name "100yyyyy" and a file name "YYYY0001.JPG" is recorded on the recording medium (2), as illustrated in FIG. 6B, according to the auto-rest method, which has been changed from the serial number method.

Figure 7A:
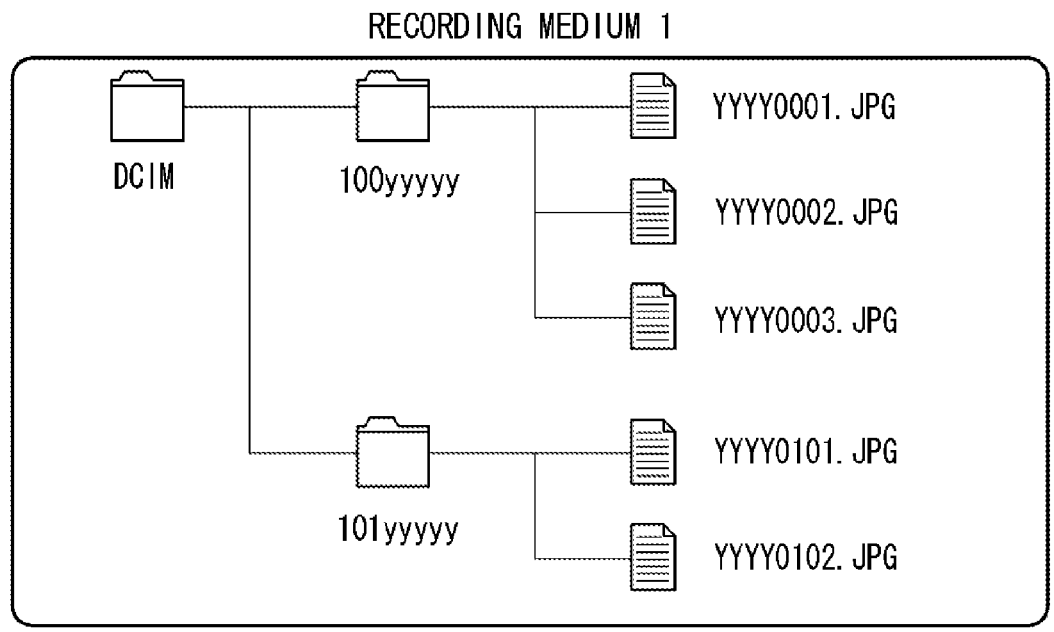
FIGS. 7A to 7C illustrate examples of file structures.
Figure 7B:
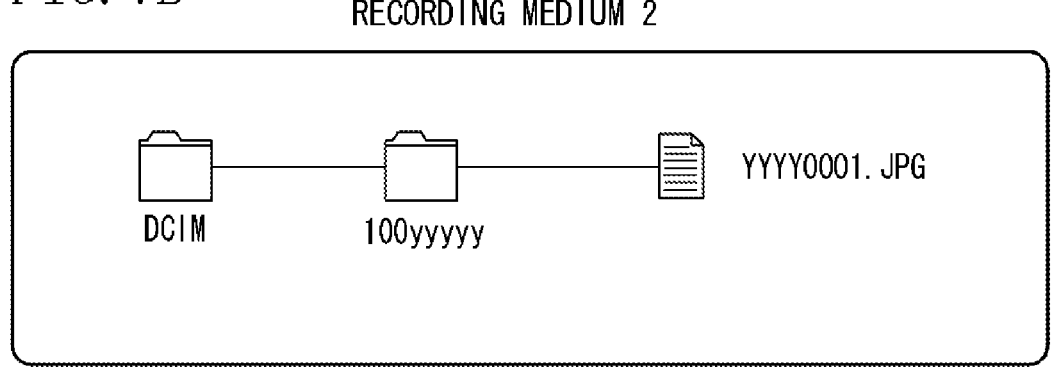
Figure 7C:
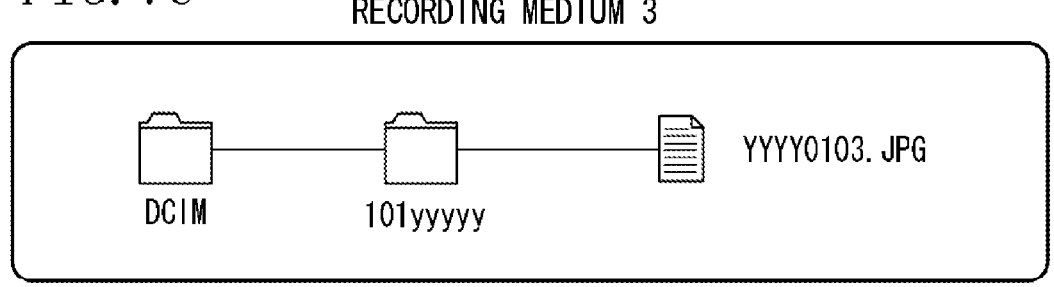

Further, when the write-once recording medium (2) is replaced with a rewritable recording medium (3), the auto-reset method is automatically changed to the serial number method. When image shooting is performed after the replacement with the recording medium (3), a file having a directory name "101yyyyy" and a file name "YYYY0103.JPG" is recorded on the recording medium (3) according to the serial number method, as illustrated in FIGS. 7A to 7C, since the information of the directory name "101yyyyy" and the file name "YYYY0102.JPG" is retained in [BUFNo].

In the write-once recording medium, it is difficult to perform editing work afterwards, and it is undesirable to assign numbers lacking in continuity or to assign a too large number. Particularly when the too large number is assigned, a situation that it is impossible to record any file despite a free space can occur. In the digital camera to which the invention is applied, it is possible to avoid such situation by automatically changing to the auto-reset method when the rewritable recording medium is replaced with the write-once recording medium when the serial number method has been set as the file name determination method.

Hereinafter, a second exemplary embodiment of the invention will be described. A configuration of the digital camera is similar to that of the first exemplary embodiment (FIG. 1), and, therefore, the description of the configuration is omitted in the following description.

Figure 8:
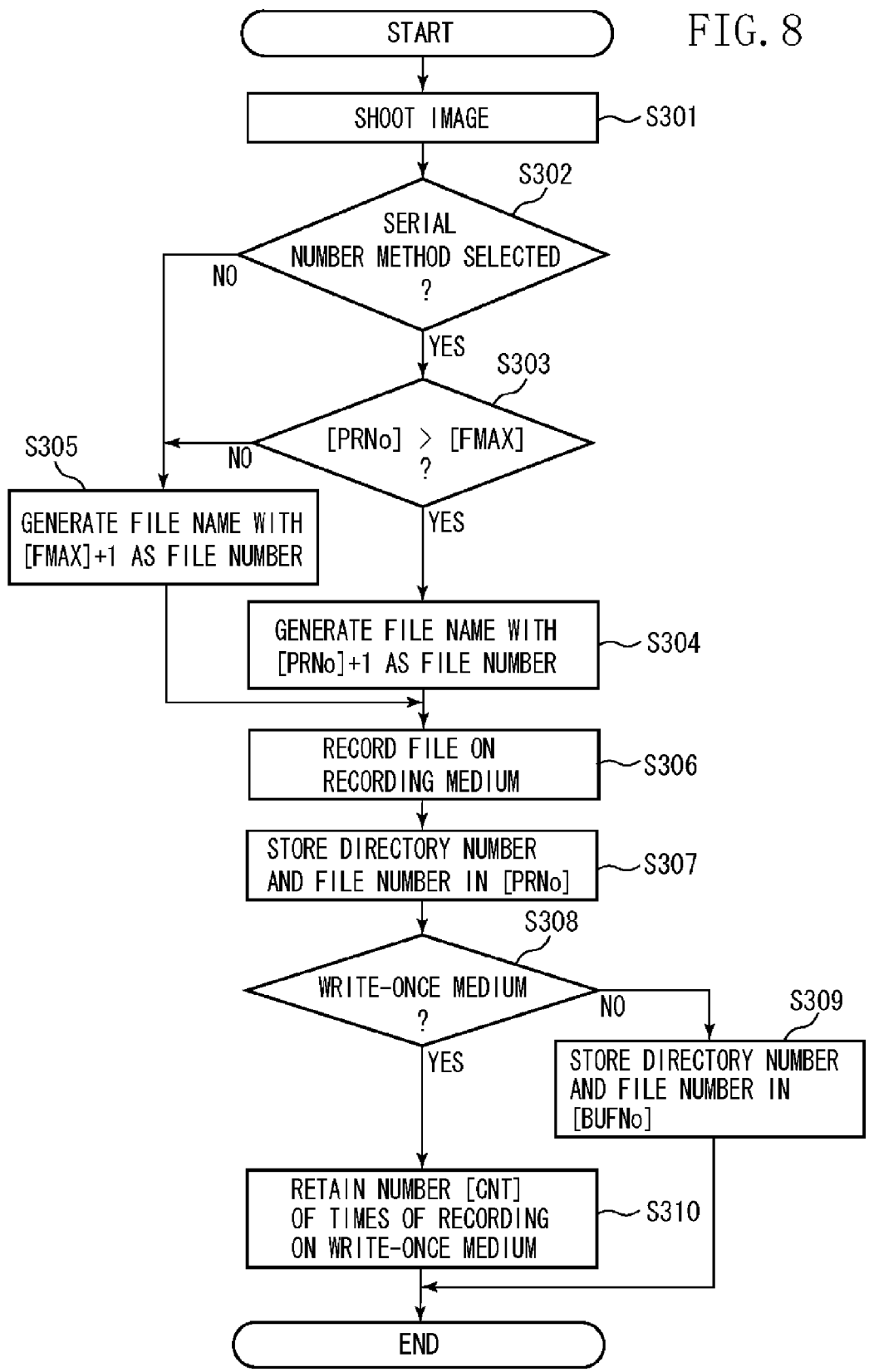
FIG. 8 is a flowchart illustrating an operation of a digital camera according to a second exemplary embodiment of the invention.
Figure 9:
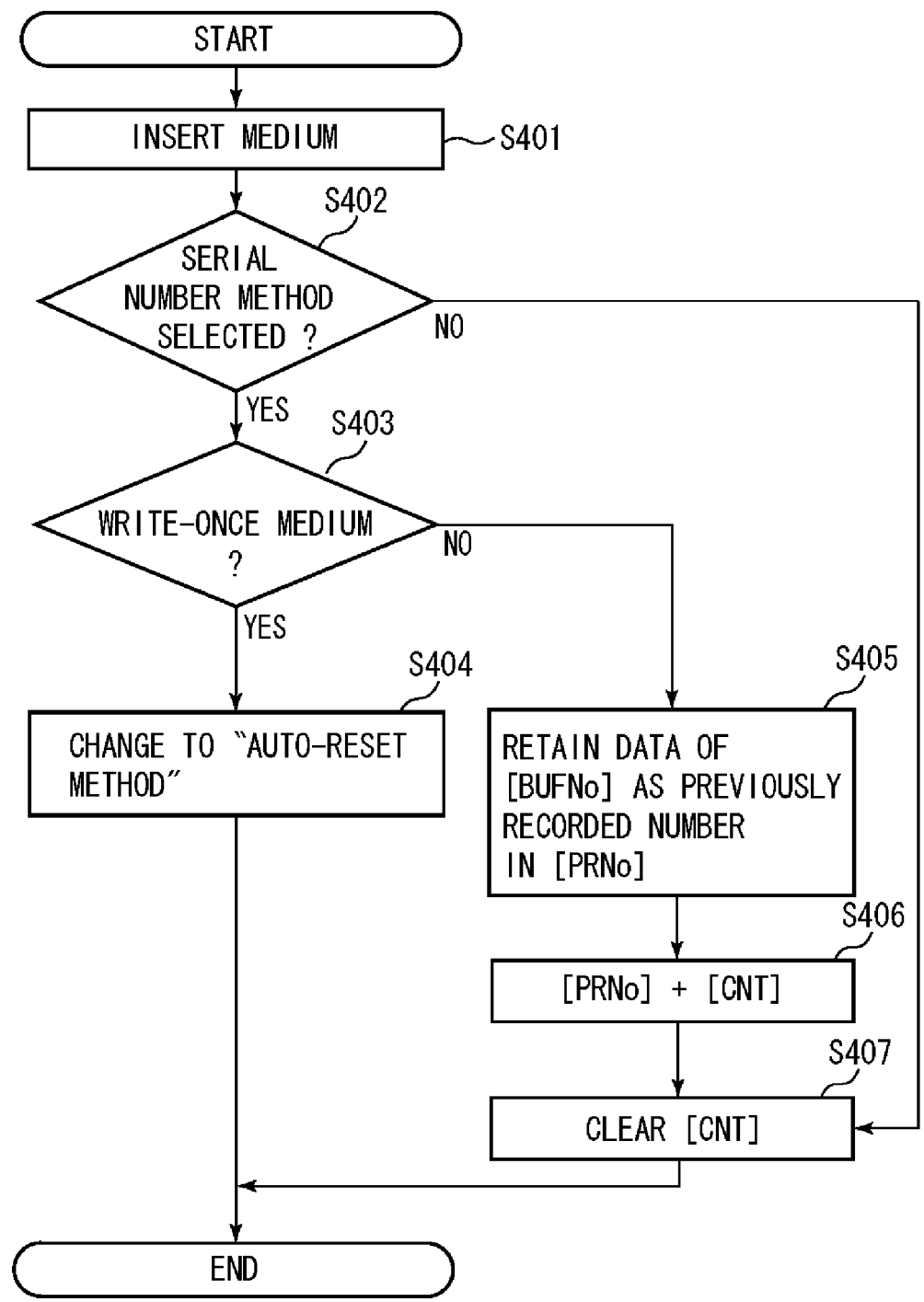
FIG. 9 is a flowchart illustrating an operation of the digital camera according to the second exemplary embodiment.

FIG. 8 and FIG. 9 are flowcharts illustrating operations of the digital camera according to the second exemplary embodiment. FIG. 8 is the flowchart illustrating a basic operation during image shooting. In step S301, when the digital camera 100 shoots a still image in a state where a recording medium (1) is inserted into the mounting portion, the system controller 101 performs processing for recording a file of image data on the recording medium (1).

Subsequently, in step S302, the system controller 101 determines whether or not the serial number method is set as the file name determination method.

When it is determined in step S302 that the serial number method is set (YES inn step S302), the system controller 101 in step S303 reads out from the built-in memory a directory number and a file number [PRNo] that are previously recorded by the camera 100 to compare them with a maximum directory number and a maximum file number [FMAX] of the recording medium (1). When [PRNo] is larger ([PRNo] >[FMAX]) (YES in step S303), the system controller 101 in step S304 generates a file name by using [PRNo]+1 as a file number, and, then in step S106, the file is recorded on the recording medium (1). When [FMAX] is larger ([PMNo]≦ [FMAX]) (NO in step S303), the system controller 101 in step S305 generates a file name by using [FMAX]+1 as a file number, and, then in step S306, the file is recorded on the recording medium (1).

When the auto-reset method, not the serial number method, is set in step S302 (NO in step S302), the system controller 101 in step S305 generates the file name by using [FMAX]+1 as a file number, and, then in step S306, records the file in the recording medium (1).

After the file recording, the system controller 101 in step S307 stores the recorded directory number and the recorded file number in [PNNo].

Subsequently, the system controller 101 determines in step S308 whether or not the recording medium (1) that has recorded the file is a write-once recording medium. When it is determined in step S308 that the recording medium (1) is not the write-once recording medium (NO in step S308), i.e., in the case of a rewritable recording medium, the system controller 101 in step S309 stores the currently recorded directory number and the currently recorded file number as the directory number and the file number that are last recorded on the rewritable recording medium in [BUFNo]. When it is determined in step S308 that the recording medium (1) is a write-once recording medium (YES in step S308), the system controller 101 in step S310 adds 1 (one) to [CNT] that retains the number of times of image shooting recorded on the write-once recording medium to update [CNT].

FIG. 9 is the flowchart illustrating an operation for replacing a recording medium (1) with another recording medium (2). When the recording medium (1) is replaced with the recording medium (2) in step S401, the system controller 101 in step S402 determines whether or not the serial number method is set. When it is determined in step S402 that the serial number method is set (YES in step S402), the system controller 101 determines in step S403 whether or not the replaced recording medium (2) is a write-once recording medium.

When it is determined in step S403 that the recording medium (2) is the write-once recording medium (YES is step S403), the system controller 101 in step S404 automatically changes the file name determination method from the serial number method to the auto-reset method. When it is determined in step S403 that the recording medium is not the write-once recording medium (NO in step S403), i.e., in the case of a rewritable recording medium, the system controller 101 in step S405 retains a directory number and a file number [BUFNo] that are last recorded on the rewritable recording medium in a previously recorded directory number and a previously recorded file number [PRNo]. Further, the system controller 101 in step S406 adds the number [CNT] of times of image shooting recorded on the write-once recording medium after the last image shooting recorded on the rewritable recording medium to [PRNo] to retain the thus-obtained number in [PRNo], and then the system controller 101 in step S407 clears [CNT].

Figure 10A:
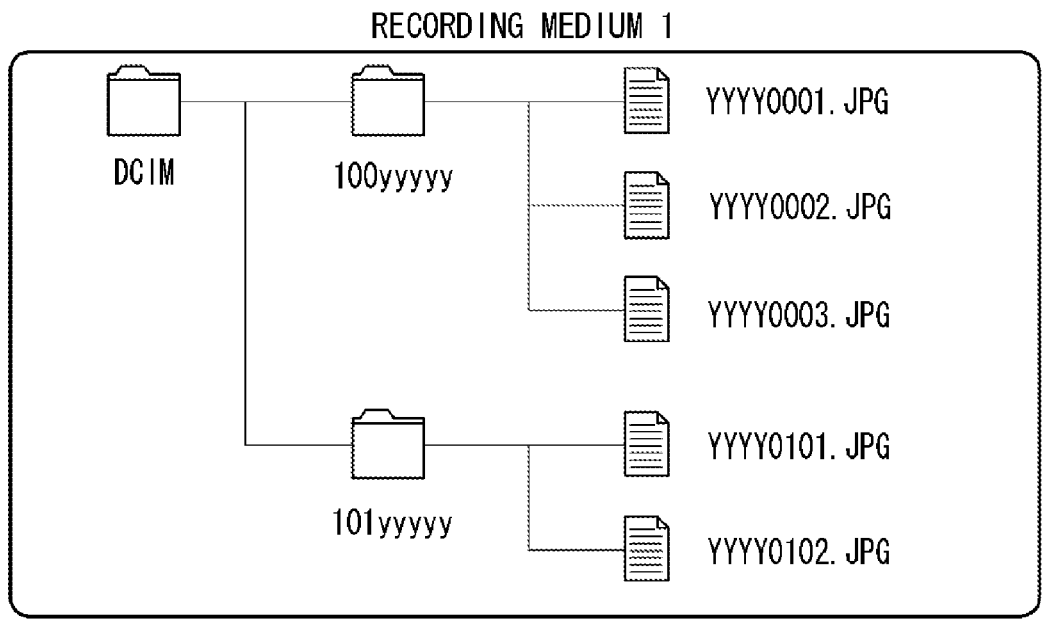
FIGS. 10A to 10C illustrate examples of file structures.
Figure 10B:
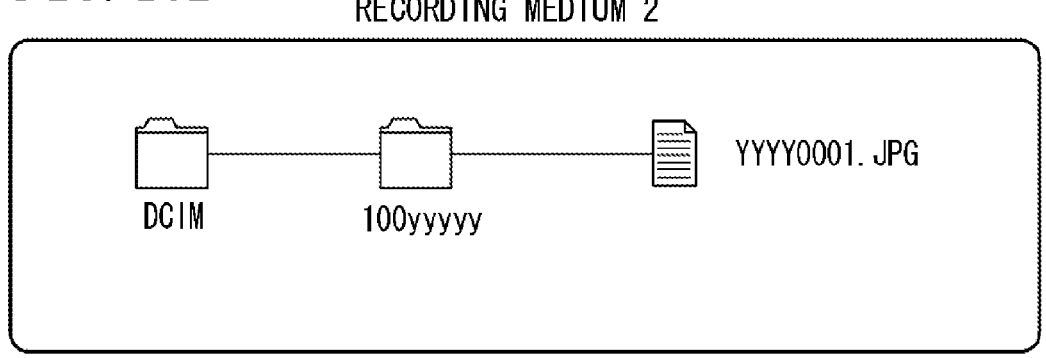

Here, it is assumed that the recording medium (1) is a rewritable recording medium and the recording medium (2) is a write-once recording medium in a state where the serial number method is set. It is assumed that files are recorded on the recording medium (1) until a directory name reaches "101yyyyy" and a file name reaches "YYYY0102.JPG", as illustrated in FIG. 1A. In such a case, when image shooting is performed after replacement with the recording medium (2), a file having a directory name "100yyyyy" and a file name "YYYY0001.JPG" is recorded on the recording medium (2), as illustrated in FIG. 10B, according to the auto-reset method, which has been changed from the serial number method.

Figure 10C:
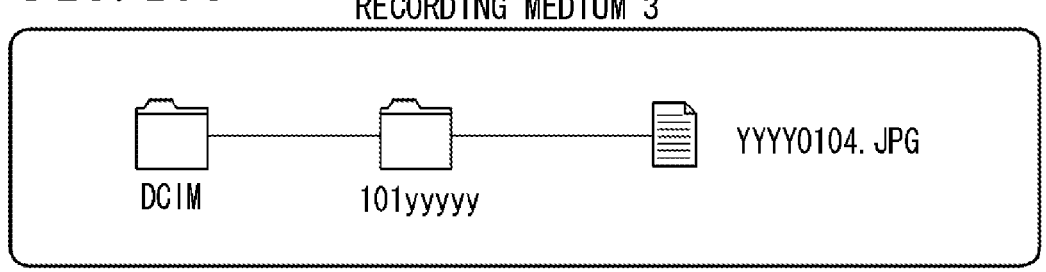

After that, when the write-once recording medium (2) is replaced with a rewritable recording medium (3), the auto-rest method is automatically changed to the serial number method. When image shooting is performed after the replacement with the recording medium (3), information of a directory name "101yyyyy" and a file name "YYYY0102.JPG" is retained in [BUFNo], while [CNT] is maintained to 1 (one), so that a file having a directory name "101yyyyy" and a file name "YYYY0104.JPG" is recorded on the recording medium (3), as illustrated in FIG. 10C.

As described above, it is possible to reflect the number assigned to the file name by the auto-rest method to the built-in memory when the rewritable recording medium (1) is replaced with the write-once recording medium (2) and the recording medium (2) is replaced with the rewritable recording medium (3) to return from the auto-reset method to the serial number method.

Hereinafter, a third exemplary embodiment of the invention will be described. Described in the first and second exemplary embodiments are the examples of automatically changing to the auto-reset method in the case of replacing a rewritable recording medium with a write-once recording medium when the serial number method is set. In the third exemplary embodiment, there will be described an example of warning that is given when a rewritable recording medium is replaced with a write-once recording medium in a state where the serial number method is set. A configuration of the digital camera is similar to that of the first exemplary embodiment (FIG. 1), and, therefore, the description of the configuration is omitted in the following description.

Figure 11:
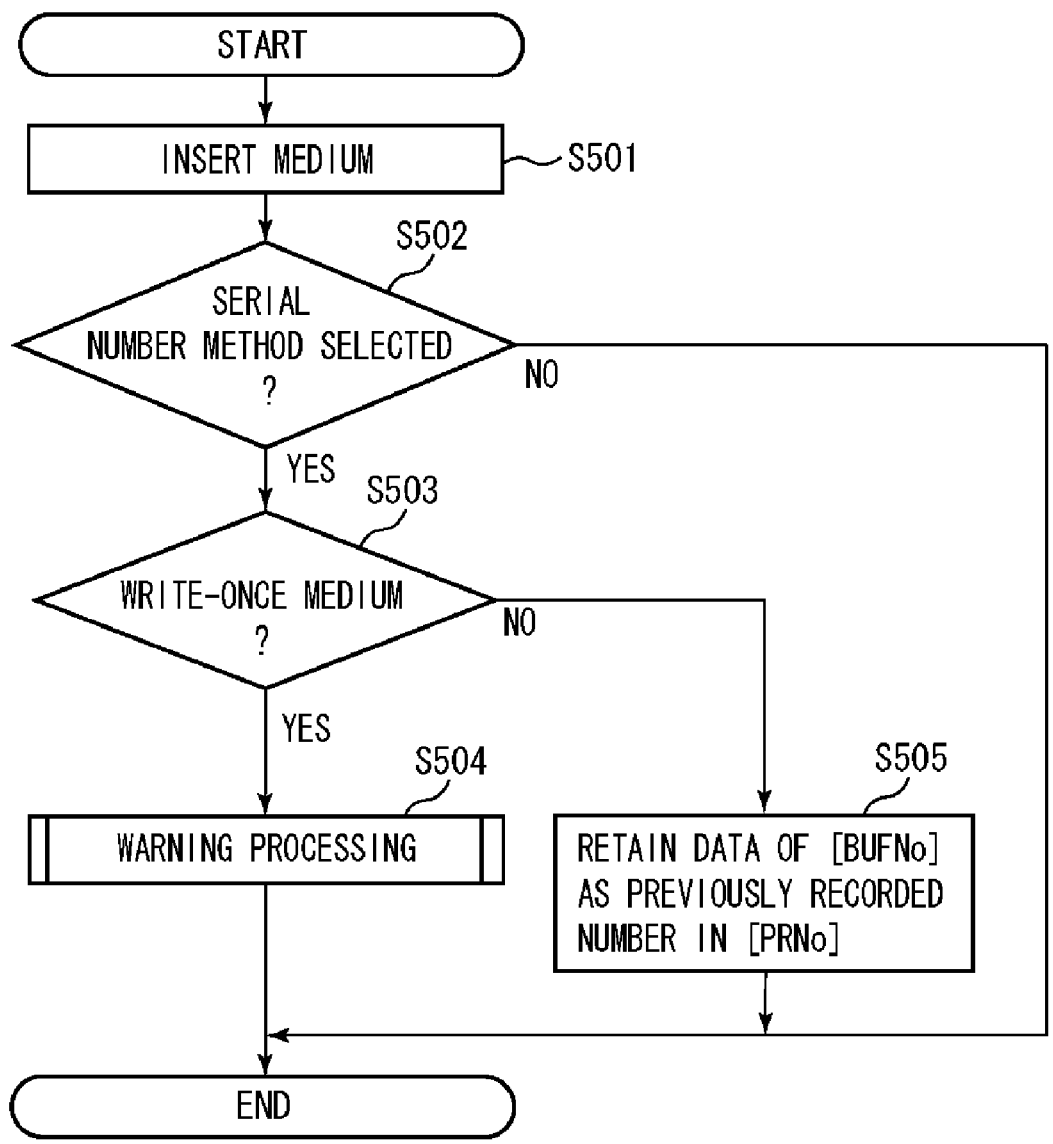
FIG. 11 is a flowchart illustrating an operation of a digital camera according to a third exemplary embodiment of the invention.

FIG. 11 is a flowchart illustrating an operation for replacing a rewritable recording medium (1) with another recording medium (2). When the recording medium (1) is replaced with the recording medium (2) in step S501, the system controller 101 determines in step S502 whether or not the serial number method is set. When it is determined in step S502 that the serial number method is set (YES in step S502), the system controller 101 determines in step S503 whether or not the replaced recording medium (2) is a write-once recording medium.

When it is determined in step S503 that the recording medium (2) is the write-once recording medium (YES in step S503), the system controller 101 performs warning processing in step S504. This warning processing will be described below. When it is determined in step S503 that the recording medium (2) is not the write-once recording medium (NO in step S503), i.e., in the case of a rewritable recording medium, the system controller 101 in step S505 retains a directory number and a file number [BUFNo] that are last recorded on the rewritable recording medium in a directory number and a file number [PRNo] that are previously recorded.

Figure 12:
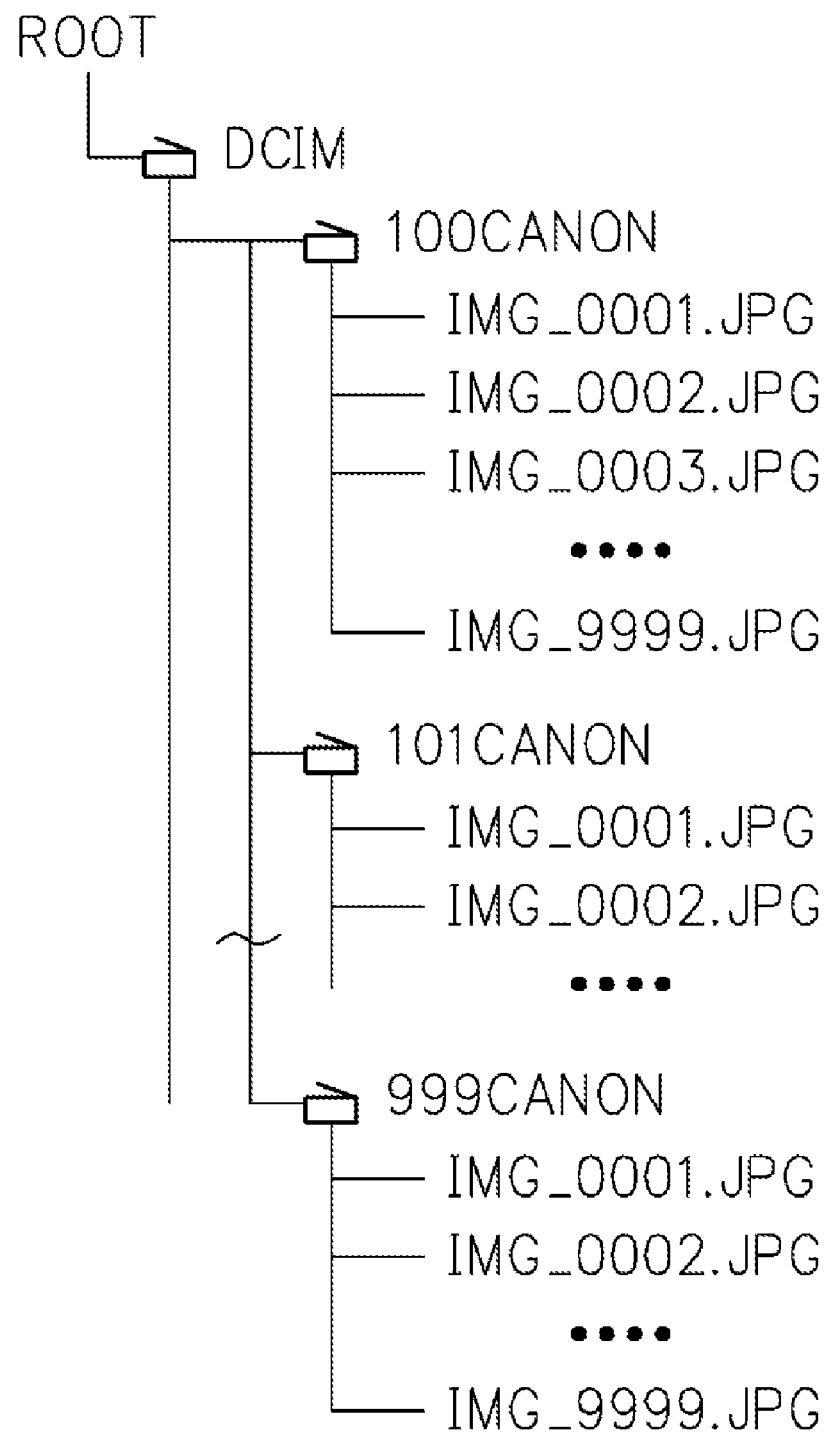
FIG. 12 is a diagram illustrating an example of a file structure.

Here, as it is described in the foregoing, according to DCF standard, a route directory "DCIM" is followed by a directory name such as "100CANON" including triple-digit numeric characters selected from 100 to 999 and an arbitrary character string composed of 5 characters. A file such as "IMG_001.JPG" that includes an arbitrary character string composed of 4 characters and numeric characters selected from 0001 to 9999 is recorded in each of directories. A maximum file name in the standard is "999CANON/IMG_9999.JPG" (see FIG. 12). Note that a file name generation rule can uniquely be determined within the DCF standard since the file name generation rule is set in consideration of the user's convenience. Therefore, the maximum file number is not always the maximum file number of the DCF standard.

In the present exemplary embodiment, when the rewritable recording medium is replaced with the write-once recording medium in a state where the file name determination method is set to the serial number method, the user is informed beforehand at an appropriate timing that the file number may reach an upper limit.

To start with, calculation of the number of remaining files (number of generatable files) A until reaching the maximum file number is described. A file number calculation unit detects the generatable file number (A) $FILE_{rem}$ by the following expression when: a current directory number is $DIR_{now}$; a current file number is $FILE_{now}$; a maximum directory number is $DIR_{max}$; a minimum file number per directory is $FILE_{min}$; and a maximum file number is $FILE_{max}$.

$$FILE_{rem} = (DIR_{max} - DIR_{now}) \cdot (FILE_{max} - FILE_{min} + 1) + (FILE_{max} - FILE_{now})$$

When the current file name is "998CANON/IMG_0100.JPG, and $DIR_{max}=999$, $FILE_{min}=0001$, and $FILE_{max}=1000$, the generatable file number A is calculated by using the expression to be 1900 files.

Figure 13:
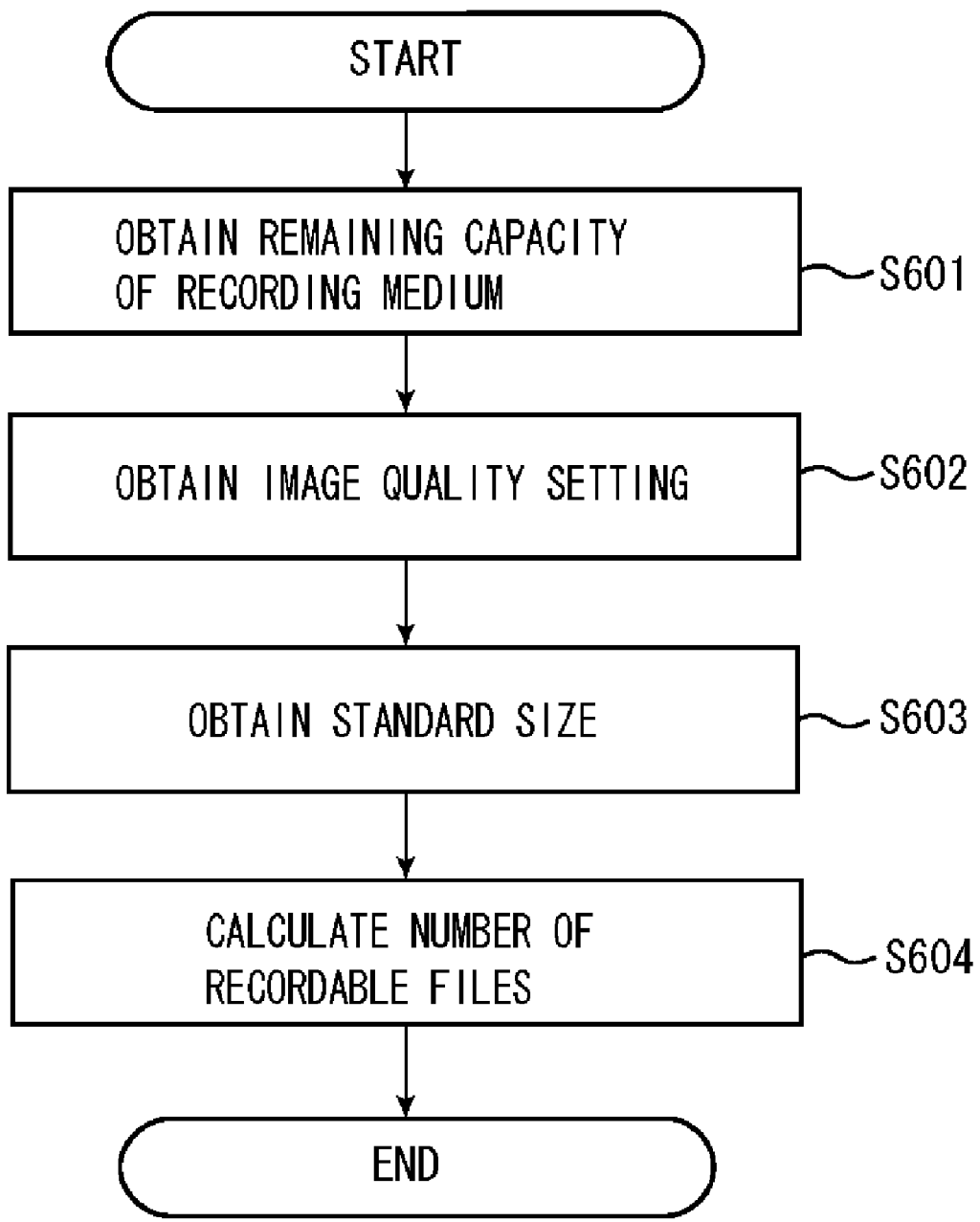
FIG. 13 is a flowchart illustrating an operation of the digital camera according to the third exemplary embodiment of the invention.

Next, calculation of the number of files that can be recorded on a recording medium (number of recordable files) B will be described. As illustrated in FIG. 13, the system controller 101 in step S601 obtains a remaining capacity (remaining recordable capacity) of the inserted recording medium 105 by a recording medium capacity obtaining unit.

Subsequently, in step S602, the system controller 101 obtains resolution and image quality currently set by an image setting obtaining unit. The user can select resolution and image quality of an image to be shot by the camera, and standard sizes of the settings are as illustrated in a standard image size table shown in Table 1. Since a file size of a compressible file such as Joint Photographic Experts Group (JPEG) varies depending on the picture, average file sizes that are obtained empirically are employed herein.

TABLE 1

| | Size | | |
|---|---|---|---|
| Image | L (Large) | M (Middle) | S (Small) |
| Normal | 320 kB | 160 kB | 40 kB |
| Fine | 640 kB | 320 kB | 80 kB |
| Superfine | 1280 kB | 640 kB | 120 kB |

In step S603, the system controller 101 obtains a standard image size corresponding to the settings from the standard image size table by the image setting obtaining unit.

In step S604, the system controller 101 detects the recordable file number B by the remaining recordable capacity obtained in step S601 and the standard image size obtained in step S603. When the remaining recordable capacity is $SIZE_{rem}$ and the standard image size is $SIZE_{std}$, the recordable file number (B) $FILE_{rem}$ is obtained by the following expression.

$$FILE_{rem} = SIZE_{rem}/SIZE_{std}$$

A file number comparison unit compares the generatable file number A with the recordable file number B obtained as described above. As a result, when the recordable file number B is larger than the generatable file number A, it is determined that the file number reaches the upper limit before the recording medium is full if the image shooting is continued.

Figure 14:
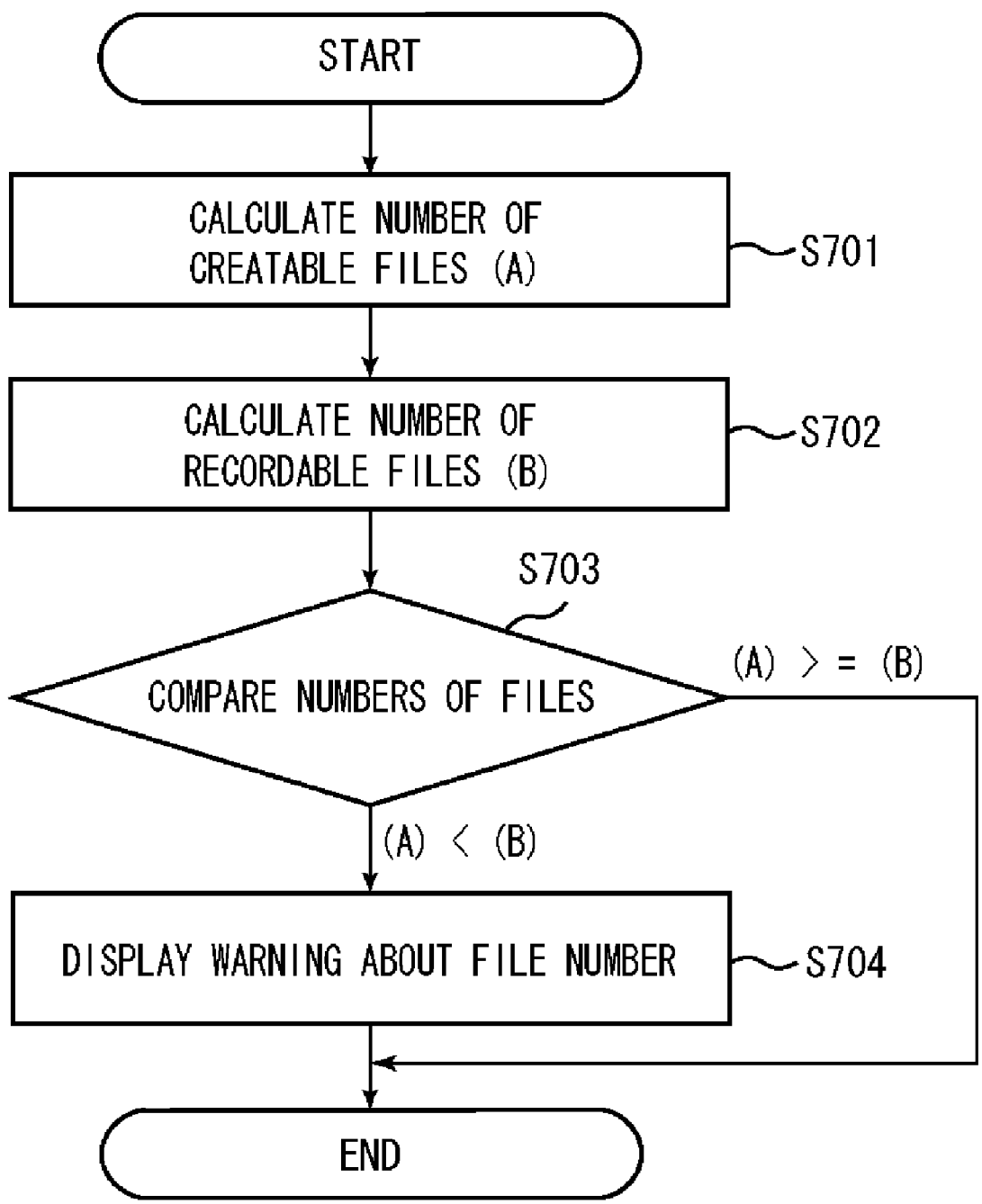
FIG. 14 is a flowchart illustrating an operation of the digital camera according to the third exemplary embodiment of the invention.

FIG. 14 is a flowchart illustrating the warning processing of step S504 in FIG. 11. In the warning processing, necessity of warning is determined depending on the remaining capacity of the write-once recording medium (2) inserted into the mounting portion.

Firstly, in step S701, the system controller 101 analyzes the files recorded on the replaced recording medium (2) to calculate the generatable file number A as described above.

In step S702, the system controller 101 detects the remaining capacity of the replaced recording medium (2) to calculate the recordable file number B as described above.

In step S703, the file number comparison unit compares the file numbers detected in step S701 and step S702. When the recordable file number B is larger than the generatable file number A, warning is performed in step S704. As the warning, information that the file number can reach the upper limit before the recording medium is full if the image shooting is continued is displayed on the display unit 108.

Though the example of giving the warning when the rewritable recording medium is replaced with the write-once recording medium when the serial number method is set is described in the present exemplary embodiment, the warning may be given during each of various operations as described below.

Figure 15:
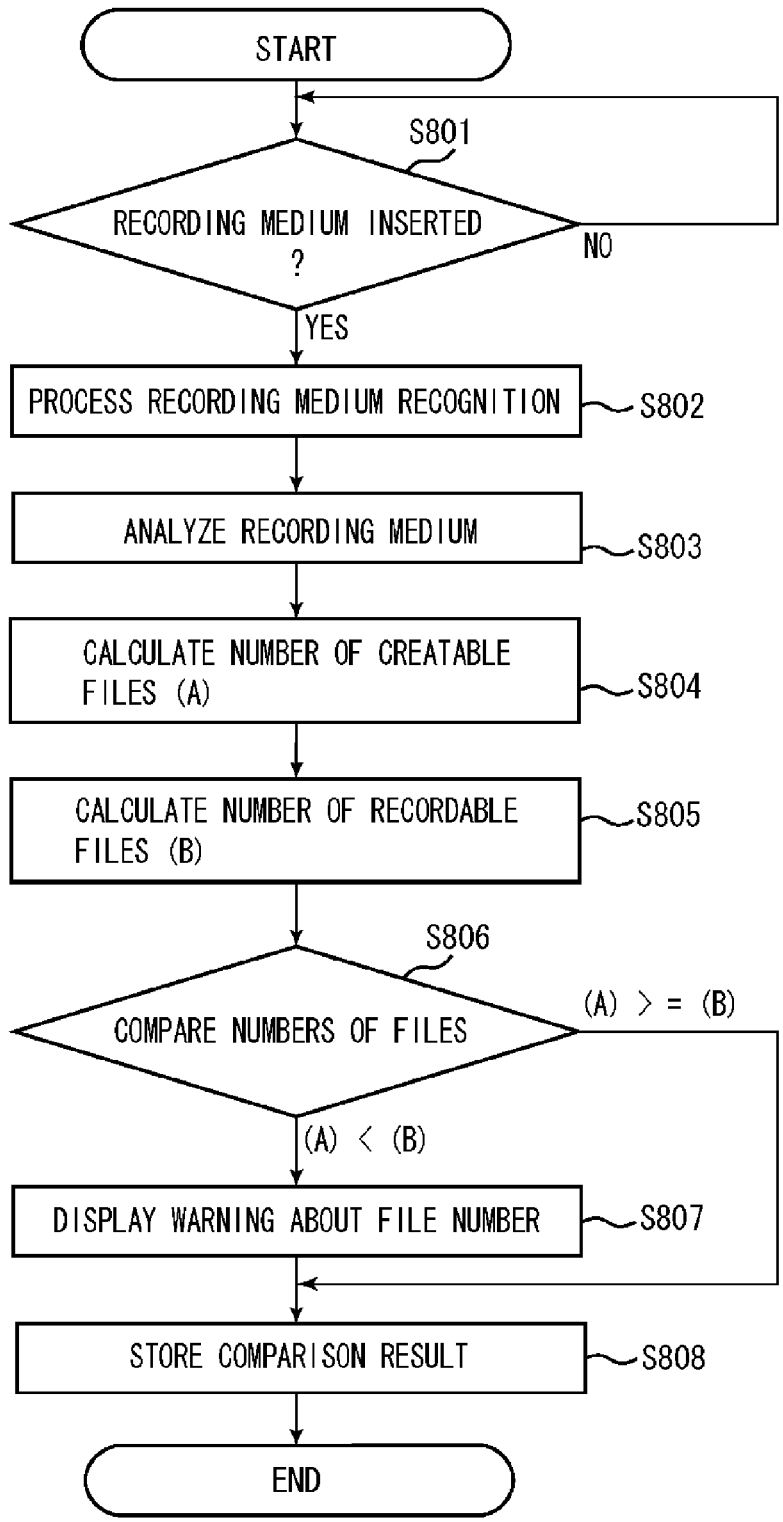
FIG. 15 is a flowchart illustrating an operation of the digital camera according to the third exemplary embodiment of the invention.

A procedure for warning in the case of recognizing a recording medium will be described with reference to FIG. 15. The recognition of a recording medium is performed when the recording medium 105 is inserted or when the camera 100 is turned on to start up the system. The system controller 101 in step S801 monitors an insertion state of the recording medium 105, so that the recognition processing is performed in step S802 for accessing the recording medium 105 when the insertion is detected.

Subsequently, in step S803, the system controller 101 analyzes files recorded on the recording medium 105 and sets a file having a largest file number as a last file. Here, in step S804, the system controller 101 sets a file number to be recorded subsequently to the thus-obtained number and calculates the number of files that can be generated (generatable file number A) before reaching the maximum file number.

In step S805, the system controller 101 detects a remaining capacity of the recording medium 105 and calculates the recordable file number B from the remaining capacity.

In step S806, the file number comparison unit compares the file numbers detected in step S804 and step S805. When the recordable file number B is larger than the generatable file number A, warning is performed in step S807. As the warning, information that the file number can reach the upper limit before the recording medium is full if the image shooting is continued is displayed on the display unit 108. In step S808, the comparison result is stored in a volatile storage medium of the camera main body.

Figure 16:
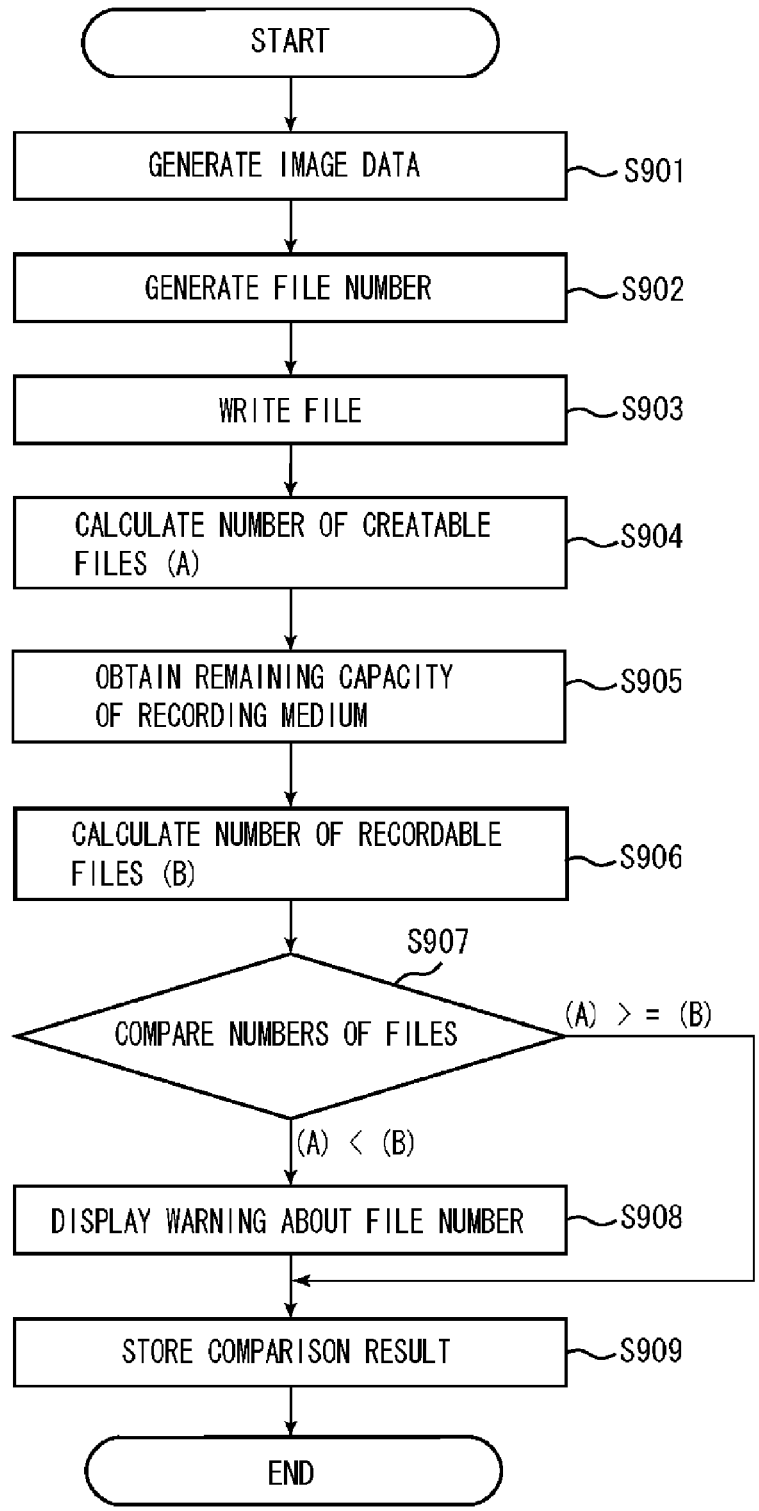
FIG. 16 is a flowchart illustrating an operation of the digital camera according to the third exemplary embodiment of the invention.

Hereinafter, a procedure for warning in the case of recording an image will be described with reference to FIG. 16. Image data is generated by recording processing by user operation in step S901, and a file name is generated from a file number generated by a file number generation unit in step S902, followed by writing in a recording medium in step S903. Due to the increase in file, a generatable file number A is updated in step S904.

The system controller 101 obtains a remaining capacity of the recording medium 105 in step S905 and calculates a recordable file number B from the remaining capacity in step S906.

In step S907, the file number comparison unit compares the file numbers detected in step S904 and step S905. When the recordable file number B is larger than the generatable file number A, warning is performed in step S908. As the warning, information that the file number can reach the upper limit before the recording medium is full if the image shooting is continued is displayed on the display unit 108. In step S909, the comparison result is stored in a volatile storage medium of the camera main body.

Figure 17:
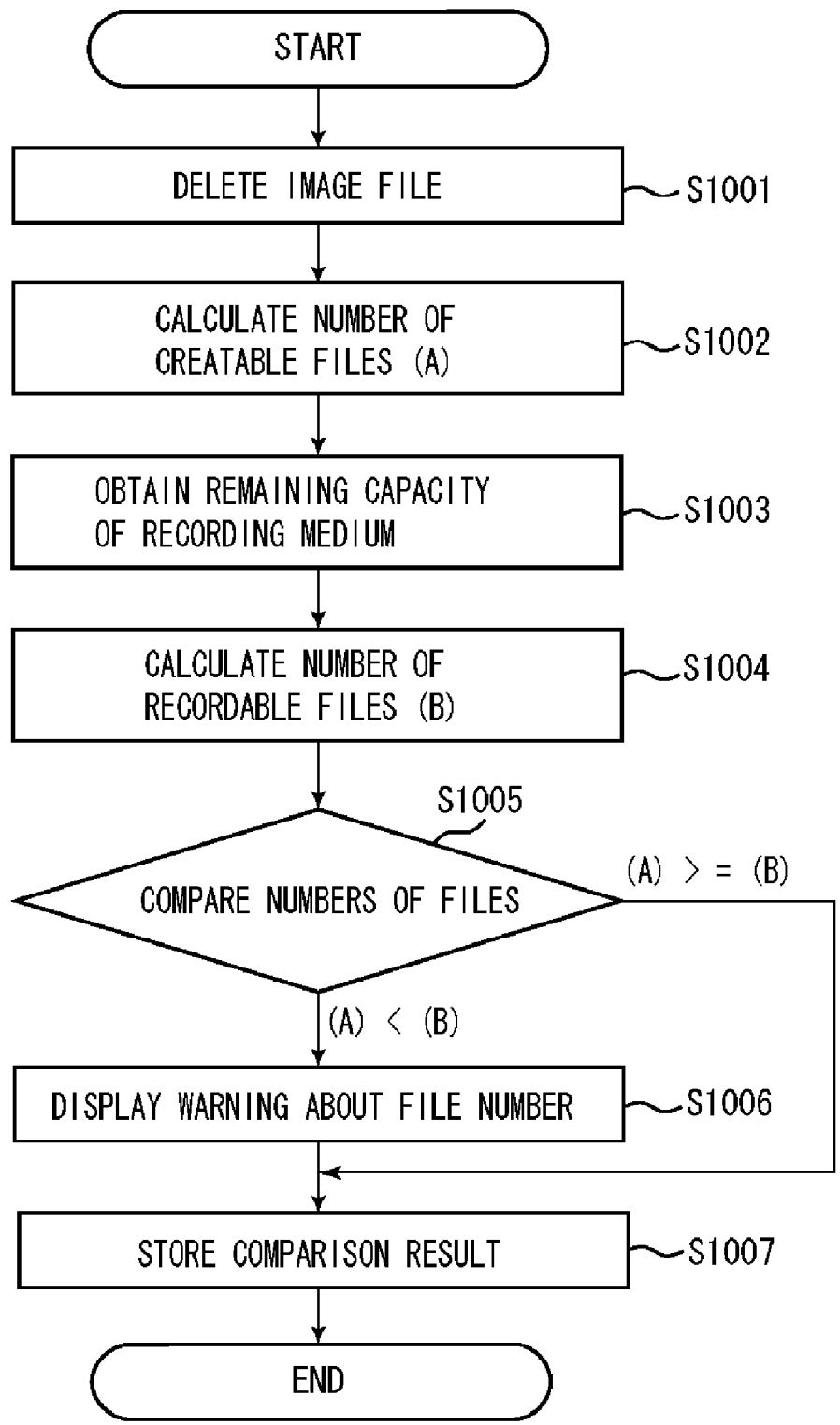
FIG. 17 is a flowchart illustrating an operation of the digital camera according to the third exemplary embodiment of the invention.

Hereinafter, a procedure for warning in the case of deleting a file will be described with reference to FIG. 17. File deletion is an operation of deleting an image during reproduction, an operation of deleting all of images of a recording medium, and an operation of formatting a recording medium. When a file is deleted by user operation in step S1001, a generatable file number A is calculated in step S1002 due to the decrease in file.

The system controller 101 obtains a remaining capacity of the recording medium 105 in step S1003 and calculates a recordable file number B from the remaining capacity in step S1004.

In step S1005, the file number comparison unit compares the file numbers detected in step S1002 and step S1004. When the recordable file number B is larger than the generatable file number A, warning is performed in step S1006. As the warning, information that the file number can reach the upper limit before the recording medium is full if the image shooting is continued is displayed on the display unit 108. In step S1007, the comparison result is stored in a volatile storage medium of the camera main body.

Figure 18:
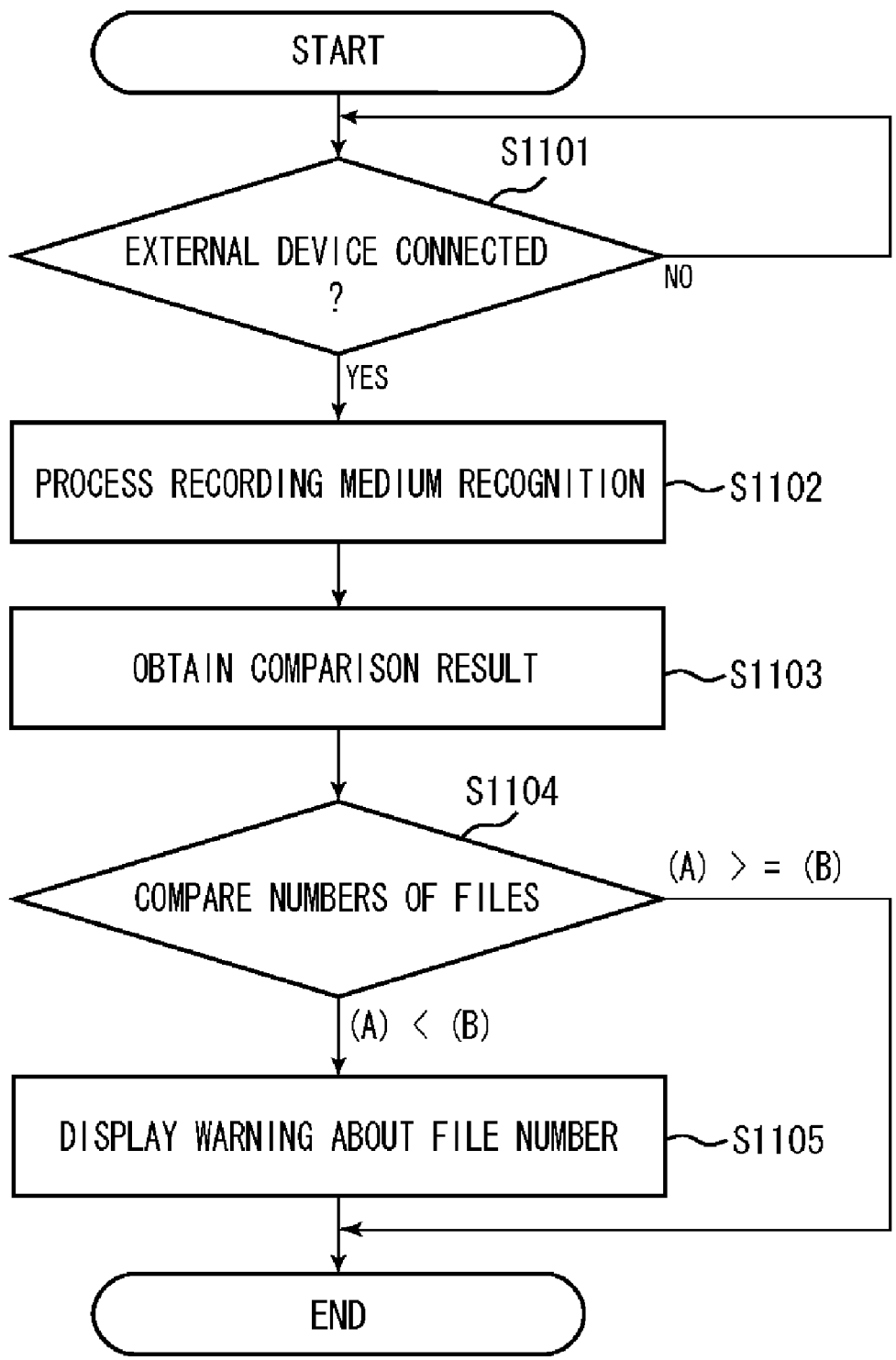
FIG. 18 is a flowchart illustrating an operation of the digital camera according to the third exemplary embodiment of the invention.

Hereinafter, a procedure for warning in the case of connecting an external device will be described with reference to FIG. 18. The system controller 101 monitors connection to an external device in step S1101 and performs connection processing when an external device is connected in step S1102. Since no change occurs in file number in the case of external device connection, the system controller 101 obtains only a previously calculated comparison result in step S1103 and performs comparison of the file numbers in step S1104 and warning as required in step S1105.

Hereinafter, a procedure for warning when image quality setting is changed will be described with reference to FIG. 19. When image quality is changed by user operation in step S1201, the system controller 101 in step S1202 obtains an image quality setting state by the image setting obtaining unit and obtains the standard image size from the standard image size table in step S1203. Since no change occurs in generatable file number A in the case of image quality setting, the system controller 101 in step S1204 obtains a latest generatable file number A.

The system controller 101 obtains a remaining capacity of the recording medium 105 in step S1205 and calculates a recordable file number B from the remaining capacity in step S1206.

In step S1207, the file comparison unit compares the file numbers detected in step S1204 and step S1206. When the recordable file number B is larger than the generatable file number A, warning is performed in step S1208. As the warning, information that the file number can reach the upper limit before the recording medium is full if the image shooting is continued is displayed on the display unit 108. In step S1209, the comparison result is stored in a volatile storage medium of the camera main body.

Though flows related to processing for displaying warnings related to file number is described above, it is unnecessary to perform such warnings when the generatable file number is sufficient such as 10000 files or more.

As to the warning during image shooting, since the user can be annoyed if the warning is displayed every time a file is generated for image shooting, the warning is displayed once, and only a warning icon is displayed after the warning display until removal of a next recording medium. Contents of the warnings are described below.

Illustrated in FIGS. 20A to 20E and FIGS. 21A to 21F are examples of displays related to the file number warning. The camera distinguishes between a shooting mode and a reproduction mode by a mode determination unit. The file number warning display varies depending on the mode, and, in a camera mode that requires the recordable file number as information, an icon is always displayed after displaying a warning sentence. Only an icon is displayed in the reproduction mode.

Figure 20A:
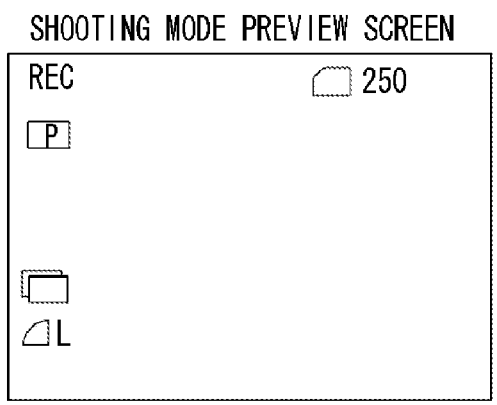
FIGS. 20A to 20E illustrate examples of display relating to file number warning.

Illustrated in FIG. 20A is a preview screen in a camera image shooting mode. A value displayed on the upper right is the recordable file number of the recording medium that is currently inserted. Contents of settings related to various image shootings are displayed as icons on the left of the screen. Here, it is assumed that the generatable file number A is 3000 files.

Figure 20B:
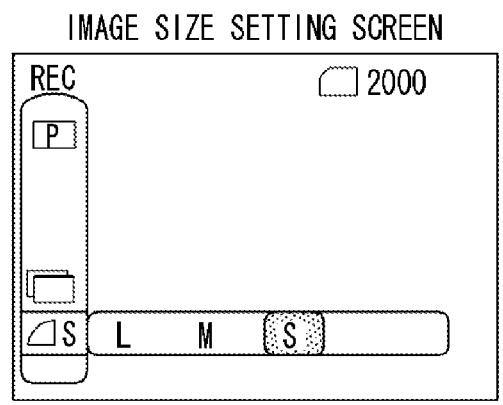

Illustrated in FIG. 20B is an image size setting screen. The user uses the user operation unit 110 to select a selected image shooting size from three types, i.e., from L (large), M (middle), and S (small). The remaining capacity is re-calculated due to a change in the setting, and the recordable file number is changed.

Figure 20C:
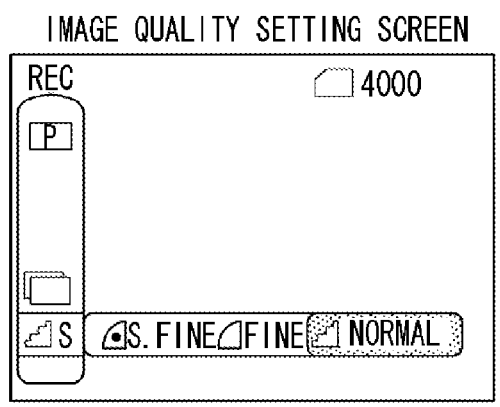
Figure 20D:
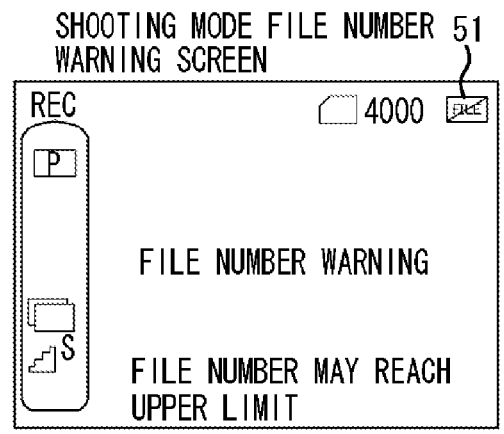
Figure 20E:
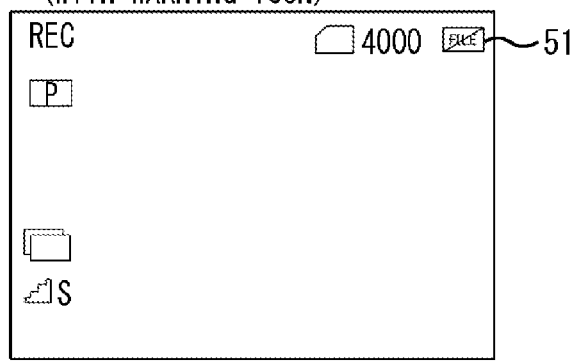

Illustrated in FIG. 20C is an image quality setting screen. It is possible to select among image qualities of three stages, i.e., from S.FINE (highest image quality), FINE (high image quality), and NORMAL (normal image quality). When the image quality is set to NORMAL, the recordable file number is further increased to 4000 files. Here, the file number exceeds the generatable file number A of 3000 files for the first time, a file number warning illustrated in FIG. 20D is displayed. As the warning, a character string, instruction, and a warning icon 51 in the upper right are displayed. The character string disappears after being displayed for a predetermined period of time, and, after that, only the warning icon 51 on the upper right is displayed (see FIG. 20E). If a file warning is displayed during image shooting or when turning on the power of the camera, the same warning as that in FIG. 20D is displayed.

Figure 21A:
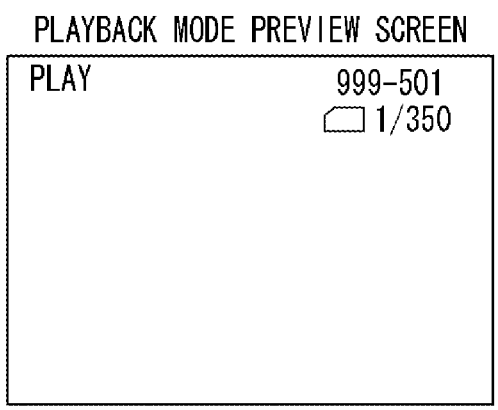
FIGS. 21A to 21F illustrate examples of display relating to file number warning.
Figure 21B:
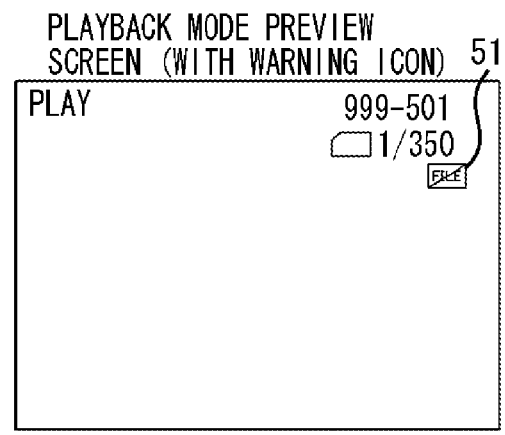

Illustrated in FIG. 21A is a display screen in a reproduction image shooting mode. A directory number and a file number as well as a total image number and a currently displayed image number that are indicated by a numerator and a denominator are displayed on the upper right. As illustrated in FIG. 21B, the generatable number warning during the reproduction mode is only the warning icon 51 on the upper right.

Figure 21C:
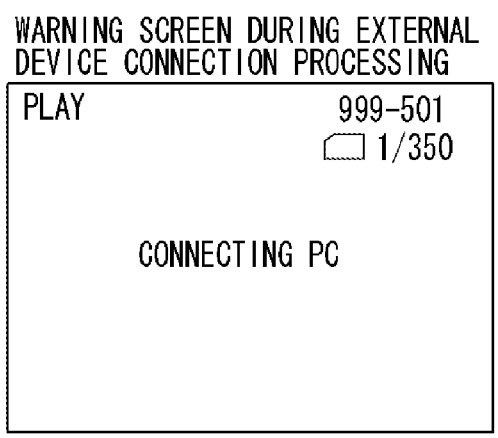
Figure 21D:
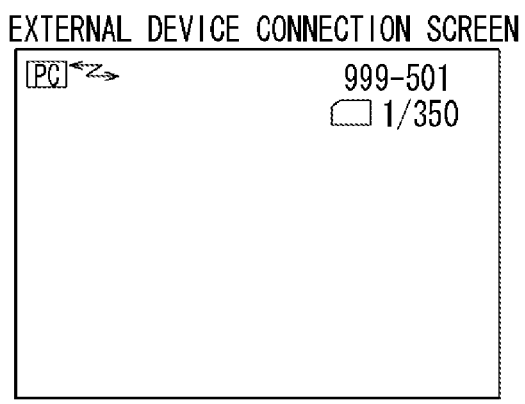
Figure 21E:
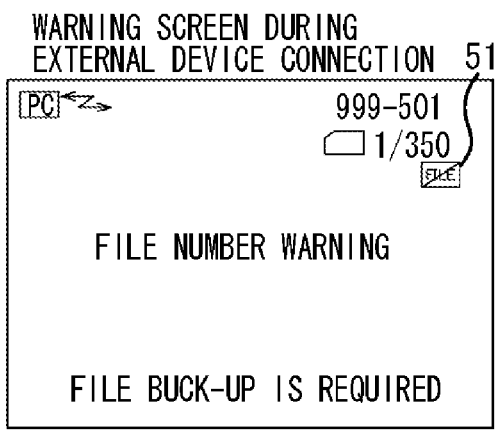
Figure 21F:
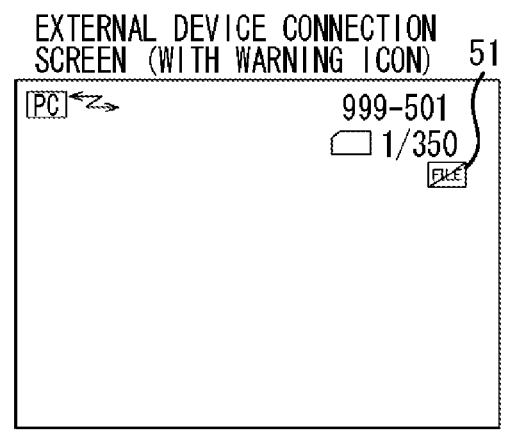

Illustrated in FIG. 21C is a display screen during external device connection processing. A character string indicating that external device connection is being performed is displayed at the center to inform the user that the connection processing is being performed. After the connection with the external device is established, an icon on the left is changed to an icon indicating that the external device connection is being performed as illustrated in FIG. 21D. As illustrated in FIG. 21E, when the conditions for displaying the number warning are satisfied when the external device connection is established, a warning character string, an instruction character string, and a warning icon 51 on the upper right are displayed. When the connected device is the one capable of transferring data such as a personal computer, the instruction character string is "file backup is required" to prompt the user to transfer and to make a backup of the file. As illustrated in FIG. 21F, in the external device connection steady state, only the upper right warning icon 51 is displayed.

The invention is also attained by supplying a storage medium storing program code of software that realizes functions of the exemplary embodiments to a system or a device. In such case, a computer (or central processing unit (CPU) or micro processing unit (MPU)) of the system or the device reads out and executes the program code stored in the storage medium.

In this case, the program code itself that is read out from the storage medium realizes the functions of the above-described exemplary embodiments, and the program code and the storage medium storing the program code constitute the invention.

As the storage medium for supplying the program code, a floppy disk, a hard disk, an optical disk, a magneto-optical disc, a compact disc read only memory (CD-ROM), compact disc recordable (CD-R), a magnetic tape, a nonvolatile memory card, or a ROM may be used.

The execution of the read-out program code by the computer is not limited to the realization of the functions of the exemplary embodiments. For example, an operating system (OS) (basic system or operating system) operating on the computer performs a part or whole of the actual processing based on instruction of the program code, and the function of the exemplary embodiment may be realized by such processing.

Further, a mode wherein the program code read out from the storage medium is written in a memory provided in a function expansion board inserted into the computer or a function expansion unit connected to the computer is possible. In this case, after writing into the memory, a CPU provided in the function expansion board or the function expansion unit performs a part or whole of actual processing based on instruction of the program code, and the function of the exemplary embodiment is realized by such processing.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-214680 filed Aug. 22, 2008, which is hereby incorporated by reference herein in its entirety.

What is claimed is:

1. A recording apparatus including a mounting portion configured to allow a rewritable recording medium and an unrewritable recording medium to be mounted thereon, the recording apparatus comprising:
   a determination unit configured to determine a file name with a number for recording a file on a recording medium mounted on the mounting portion; and
   a recording control unit configured to record, on the recording medium mounted on the mounting portion, the file using the file name determined by the determination unit,
   wherein the determination unit does not change a file name determination method in a case where a rewritable recording medium mounted on the mounting portion is replaced with another rewritable recording medium, and the determination unit changes a file name determination method in a case where the rewritable recording medium is replaced with an unrewritable recording medium.

2. The recording apparatus according to claim 1, further comprising a built-in memory configured to store number information to be used for determining a number to be assigned to a file name,
   wherein the determination unit is capable of executing a first determination method for determining the number to be assigned to the file name by comparing the number information stored in the built-in memory with a number of a file stored in the recording medium mounted on the mounting portion and a second determination method for determining the number to be assigned to the file name by referring to a number of a file stored in the recording medium mounted on the mounting portion without using the number information stored in the built-in memory.

3. The recording apparatus according to claim 2, wherein the determination unit changes the file name determination method from the first determination method to the second determination method when the recording medium mounted on the mounting portion is replaced such that the rewritable recording medium is replaced with the unrewritable recording medium when the determination unit is in a state of executing the first determination method.

4. The recording apparatus according to claim 3, wherein the determination unit changes the file name determination method from the second determination method to the first determination method when the recording medium mounted on the mounting portion is replaced such that the unrewritable recording medium is replaced with the rewritable recording medium.

5. The recording apparatus according to claim 4, wherein, when the recording medium mounted on the mounting portion is replaced such that the unrewritable recording medium is replaced with the rewritable recording medium and the second determination method is changed to the first determination method, the determination unit reflects a number assigned to a file name by the second determination method in the built-in memory.

6. The recording apparatus according to claim 1, wherein the first determination method is a method of comparing the number information stored in a built-in memory with a maximum file number stored in the recording medium mounted on the mounting portion and assigning a number obtained by adding 1 (one) to the larger number, and the second determination method is a method of assigning a number obtained by adding 1 (one) to the maximum file number stored in the recording medium mounted on the mounting portion.

7. The recording apparatus according to claim 2, wherein the number to be assigned to the file name has an upper limit.

8. The recording apparatus according to claim 1, wherein the determination unit and the recording control unit are in conformity with a Design rule for Camera File system (DCF) standard.

9. A method for controlling a recording apparatus including a mounting portion configured to allow a rewritable recording medium and an unrewritable recording medium to be mounted thereon, a determination unit configured to determine a file name with a number for recording a file on a recording medium mounted on the mounting portion, and a recording control unit configured to record, on the recording medium mounted on the mounting portion, the file using the file name determined by the determination unit, the method comprising changing a file name determination method in a case where a rewritable recording medium mounted on the mounting portion is replaced with an unrewritable recording medium, wherein in a case where a rewritable recording medium mounted on the mounting portion is replaced with another rewritable recording medium a file name determination method is not changed.

10. A non-transitory storage medium storing a program that causes a computer to function as a determination unit for determining a file name with a number for recording a file on a recording medium mounted on a mounting portion configured to allow a rewritable recording medium and an unrewritable recording medium to be mounted thereon, and a recording control unit recording, on the recording medium mounted on the mounting portion, the file using the file name determined by the determination unit, wherein the determination unit does not change a file name determination method in a case where a rewritable recording medium mounted on the mounting portion is replaced with another rewritable recording medium, and the determination unit changes a file name determination method in a case where the rewritable recording medium is replaced with an unrewritable recording medium.

* * * * *